(12) United States Patent
Frazzoli et al.

(10) Patent No.: US 10,234,864 B2
(45) Date of Patent: Mar. 19, 2019

(54) PLANNING FOR UNKNOWN OBJECTS BY AN AUTONOMOUS VEHICLE

(71) Applicant: nuTonomy Inc., Cambridge, MA (US)

(72) Inventors: Emilio Frazzoli, Zurich (CH); Baoxing Qin, Singapore (SG)

(73) Assignee: nuTonomy Inc., Boston, MA (US)

( * ) Notice: Subject to any disclaimer, the term of this patent is extended or adjusted under 35 U.S.C. 154(b) by 0 days.

(21) Appl. No.: 15/451,703

(22) Filed: Mar. 7, 2017

(65) Prior Publication Data

US 2018/0259967 A1    Sep. 13, 2018

(51) Int. Cl.
| | |
|---|---|
| *G05D 1/02* | (2006.01) |
| *G05D 1/00* | (2006.01) |
| *G08G 1/16* | (2006.01) |
| *B60W 10/20* | (2006.01) |
| *B60W 10/184* | (2012.01) |
| *B60W 30/14* | (2006.01) |
| *B60W 30/09* | (2012.01) |

(52) U.S. Cl.
CPC ......... *G05D 1/0219* (2013.01); *B60W 10/184* (2013.01); *B60W 10/20* (2013.01); *B60W 30/09* (2013.01); *B60W 30/143* (2013.01); *G05D 1/0088* (2013.01); *G05D 1/0238* (2013.01); *G05D 1/0257* (2013.01); *G08G 1/166* (2013.01); *B60W 2420/42* (2013.01); *B60W 2420/52* (2013.01); *B60W 2550/10* (2013.01); *B60W 2550/12* (2013.01); *B60W 2550/14* (2013.01); *B60W 2550/20* (2013.01); *B60W 2720/24* (2013.01); *G05D 2201/0213* (2013.01)

(58) Field of Classification Search
CPC .... B60W 30/08; B60W 30/085; B60W 30/09; B60W 30/095; B60W 30/0953; B60W 30/0956; G08G 1/16; G08G 1/161; G08G 1/163; G08G 1/164; G08G 1/166; G08G 1/167; G05D 1/0212; G05D 1/0214; G05D 1/0219; G05D 1/0223; G05D 1/0231; G05D 1/0238; G05D 1/024; G05D 1/0242; G05D 1/0246; G05D 1/0248; G05D 1/0251; G05D 1/0253; G05D 1/0255; G05D 1/0257; G05D 1/0259; G05D 1/0268; G05D 1/027; G05D 1/0274; G05D 1/0276; G05D 1/0278; G05D 1/028; G05D 1/0285; G05D 1/0287; G05D 1/0289; G05D 1/0291; G05D 1/0088
See application file for complete search history.

(56) References Cited

U.S. PATENT DOCUMENTS

| | | |
|---|---|---|
| 6,768,813 B1 | 7/2004 | Nakayama |
| 8,605,946 B2 | 12/2013 | Iwasaki et al. |
| 8,611,591 B2 | 12/2013 | Coffman et al. |

(Continued)

OTHER PUBLICATIONS

Bertozzi, Massimo, et al., "Stereo inverse perspective mapping: theory and applications", Image and Vision Computing 16 (1998) pp. 585-590.

(Continued)

*Primary Examiner* — Thomas G Black
*Assistant Examiner* — Sara J Lewandroski
(74) *Attorney, Agent, or Firm* — Fish & Richardson P.C.

(57) ABSTRACT

Among other things, a world model is maintained of an environment of a vehicle. A hypothetical object in the environment that cannot be perceived by sensors of the vehicle is included in the world model.

40 Claims, 18 Drawing Sheets

(56) References Cited

U.S. PATENT DOCUMENTS

| | | | |
|---|---|---|---|
| 9,434,382 B1 | 9/2016 | Prokhorov et al. | |
| 9,476,970 B1 | 10/2016 | Fairfield et al. | |
| 9,501,932 B2 | 11/2016 | Sakai et al. | |
| 9,600,768 B1* | 3/2017 | Ferguson | G06N 5/02 |
| 9,645,577 B1 | 5/2017 | Frazzoli et al. | |
| 9,836,895 B1 | 12/2017 | Nygaard et al. | |
| 1,003,703 A1 | 7/2018 | Nilsson et al. | |
| 2006/0155464 A1 | 7/2006 | Smartt | |
| 2007/0061074 A1 | 3/2007 | Safoutin | |
| 2008/0266168 A1* | 10/2008 | Aso | B60W 40/02 342/70 |
| 2009/0024357 A1* | 1/2009 | Aso | B60W 30/10 702/181 |
| 2009/0058677 A1* | 3/2009 | Tseng | G08C 17/02 340/904 |
| 2009/0237263 A1 | 9/2009 | Sawyer | |
| 2011/0231095 A1 | 9/2011 | Nakada et al. | |
| 2012/0140039 A1 | 6/2012 | Ota et al. | |
| 2012/0275524 A1 | 11/2012 | Lien et al. | |
| 2013/0223686 A1 | 8/2013 | Shimizu et al. | |
| 2013/0304349 A1 | 11/2013 | Davidson | |
| 2013/0328916 A1* | 12/2013 | Arikan | G06T 11/20 345/619 |
| 2014/0088855 A1 | 3/2014 | Ferguson | |
| 2015/0120125 A1* | 4/2015 | Thomson | B66F 9/063 701/25 |
| 2016/0047657 A1 | 2/2016 | Caylor et al. | |
| 2016/0109245 A1* | 4/2016 | Denaro | G01C 21/26 701/450 |
| 2016/0137206 A1* | 5/2016 | Chandraker | G06T 17/00 382/104 |
| 2016/0147921 A1* | 5/2016 | Vanholme | B60W 50/029 703/6 |
| 2016/0266581 A1* | 9/2016 | Dolgov | G05D 1/0248 |
| 2016/0282874 A1* | 9/2016 | Kurata | G05D 1/0289 |
| 2016/0327953 A1 | 11/2016 | Nilsson et al. | |
| 2017/0008521 A1 | 1/2017 | Braunstein et al. | |
| 2017/0262750 A1 | 9/2017 | Kozuka et al. | |
| 2017/0291608 A1* | 10/2017 | Engel | B60W 30/18163 |
| 2017/0327128 A1* | 11/2017 | Denaro | G01C 21/26 |
| 2017/0341652 A1 | 11/2017 | Sugawara et al. | |
| 2017/0345311 A1 | 11/2017 | Sugiura et al. | |
| 2017/0345321 A1* | 11/2017 | Cross | G01C 23/005 |
| 2017/0369051 A1* | 12/2017 | Sakai | B60W 30/09 |
| 2018/0113459 A1* | 4/2018 | Bennie | G05D 1/0088 |
| 2018/0114442 A1* | 4/2018 | Minemura | B60T 7/12 |
| 2018/0120859 A1* | 5/2018 | Eagelberg | G05D 1/0088 |
| 2018/0217233 A1 | 8/2018 | Lee | |
| 2018/0259968 A1 | 9/2018 | Frazzoli et al. | |
| 2018/0259969 A1 | 9/2018 | Frazzoli et al. | |

OTHER PUBLICATIONS

Himmelsbach M., et al., "Fast Segmentation of 3D Point Clouds for Ground Vehicles", 2010 IEEE Intelligent Vehicles Symposium, University of California, San Diego, CA, USA, Jun. 21-24, 2010 (6 pages).

Transaction history and application as filed of U.S. Appl. No. 15/451,734, filed Mar. 7, 2017.

Transaction history and application as filed of U.S. Appl. No. 15/451,747, filed Mar. 7, 2017.

U.S. Appl. No. 15/451,734, filed Mar. 7, 2017, Frazzoli et al.

U.S. Appl. No. 15/451,747, filed Mar. 7, 2017, Frazzoli et al.

U.S. Appl. No. 16/125,993, filed Sep. 10, 2018, Frazzoli et al.

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

Shackelford et al., "Urban Road Network Extraction from High-Resolution Multispectral Data," 2nd GRSS/ISPRS Joint Workshop on Remote Sensing and Data Fusion over Urban Areas, May 23, 2003, pp. 142-146.

International Search Report and Written Opinion in International Application No. PCT/US2018/21208, dated Jul. 11, 2018, 17 pages.

* cited by examiner

PLANNING FOR UNKNOWN OBJECTS BY AN AUTONOMOUS VEHICLE

BACKGROUND

In making driving decisions, typical autonomous vehicle (AV) systems take account of objects—such as other vehicles and obstacles—that the AV system knows are in the environment of the AV, either because sensor systems on the AV observe the objects, or because the objects are identified by maps or other data sources. For making driving decisions, the AV systems may maintain world models that include the objects known to be in the AV's environment. Challenges to good driving decisions also arise from vehicles and obstacles that the AV cannot perceive and does not otherwise know to exist based on available data.

SUMMARY OF THE TECHNOLOGIES

The technologies described in this document enable an AV system to plan for risks associated with objects that the AV may have in its environment but be unaware of. The AV system then can make driving decisions—including driving decisions that are relatively safe in view of potentially unsafe scenarios—that take account of the unknown possible objects in its environment. For this purpose, in some implementations of these technologies, the AV system determines the boundaries between perceived worlds in the world model and unperceived worlds. The AV system then hypothesizes the presence or attributes of possible unknown objects (which we sometimes call "dark objects") in the unperceived worlds, based on a variety of factors and approaches. These hypothetical objects and their attributes are then added to the world model for use in making driving decisions that accommodate not only the known objects in the perceived worlds but also the unknown objects (or so called, dark objects) in the unperceived worlds.

In general, in an aspect, a world model of an environment of a vehicle is maintained. Maintaining of the world model accesses a database comprising road network information, or uses data from one or more sensors, or both. The world model includes a hypothetical object in the environment that cannot be perceived by sensors of the vehicle. A hypothetical object comprises a moving object, or an object that uses a path of travel from which the vehicle is excluded, or both. The hypothetical object may comprise at least one of the following: a second vehicle, a bicycle, a bus, a train, a pedestrian, and an animal. Implementations of including the hypothetical object in the world model comprises selecting a type of the hypothetical object and an attribute of the hypothetical object probabilistically based on objects previously observed in the environment. The attribute comprises a size or a speed or both. The world model in the environment includes one or more known objects that are perceived by sensors of the vehicle or are otherwise known. The hypothetical objects and the known objects maintained by the world model are in different parts of the environment. The different parts of the environment comprise a perceived world and an unperceived world. The perceived world and the unperceived world are separated by a boundary.

Implementations may include detecting of the boundary. Detecting of the boundary uses data from one or more sensors to distinguish the observable ground from a foreground that obscures a portion of the ground. The one or more sensors comprise sensors of the vehicle, or sensors offboard the vehicle, or both.

A location of the ego vehicle is determined based on a road network database and one or more sensors. From a road network database, traffic lane information is also queried. Stored data, acquired from any databases or from any sensors, may be used to infer a possible location of the hypothetical object. Determining a location of the hypothetical objects is based on querying traffic lane information from a database and discretizing the traffic lane into discretized points. Implementations may generate an unknown skeleton of discretized points of a lane that cannot be perceived by sensors of the vehicle. The hypothetical object in the world model is generated by iterating the following through discretized points: generating a representative shape at a discretized point of the unknown skeleton, and evaluating whether the representative shape is completely within the unperceived world. If the representative shape is completely within the unperceived world, a representative shape is treated as the hypothetical object.

Implementations may apply temporal filtering to determine a location of the hypothetical object. The filtering comprises smoothing an unknown skeleton by a forward propagated unknown skeleton, wherein the forward propagated unknown skeleton is generated by moving forward an old unknown skeleton along a traffic lane.

The hypothetical object in the world model is associated with one or more attributes. One or more of the attributes are related to a possible motion state of the hypothetical object. The motion state may be a stationary condition, or a moving condition, or a speed, or a moving direction, or a combination of two or more of them. The speed is set to less than or equal to a predetermined maximum value. The predetermined maximum value comprises a speed limit. In some cases, the predetermined maximum value comprises a quantity derived from other objects concurrently or previously observed in the environment. The predetermined maximum value may be a quantity derived from historical data, road configuration, traffic rules, an event, a time, a weather condition, or a combination of two or more of them.

The one or more sensors may comprise one or more of the following: a radar sensor, a lidar sensor, and a camera sensor. The camera sensor includes a stereo camera sensor or a monocular camera sensor, or both.

Implementations update a trajectory for the vehicle based on the world model and executes the trajectory for the vehicle. The vehicle comprises an autonomous vehicle.

In general, in an aspect, data representing an observable part of an environment of a vehicle is received from a sensor. Data representing a non-observable part of the environment, including data representing at least one hypothetical object in the non-observable part of the environment, is generated. Commands for operation of the vehicle within the environment is generated. The commands depend on the data representing the observable part of the environment and on the data representing the hypothetical object in the non-observable part of the environment. The hypothetical object may comprise a moving object. In some cases, the hypothetical object comprises an object that uses a path of travel from which the vehicle is excluded. The hypothetical object can be at least one of: a vehicle, a bicycle, a bus, a train, a pedestrian, and an animal.

Implementations of generating data representing a non-observable part of the environment comprise selecting a type of the hypothetical object and an attribute of the hypothetical object probabilistically based on objects previously observed in the environment. In some examples, the hypothetical object comprises a vehicle and the attribute comprises a size and a speed.

The observable part and the non-observable part are separated by a boundary. The technologies comprise detecting of the boundary. Detecting the boundary comprises using data from the sensor to distinguish the observable ground from a foreground that obscures a portion of the ground. Generating data representing the non-observable part of the environment comprises one or more of the following data processing steps: (1) using stored data to infer a possible location of the hypothetical object, (2) querying traffic lane information from a road network database, (3) determining a location of the vehicle based on a road network database and one or more sensors, (4) querying traffic lane information from a database and discretizing the traffic lane into discretized points, (5) generating an unknown skeleton of discretized points of a lane that cannot be perceived by the sensor, (6) generating a representative shape at a discretized point of the unknown skeleton, and (7) evaluating if the representative shape is completely within the non-observable part. A representative shape may be treated as the hypothetical object.

Implementations may apply temporal filtering to determine a location of the hypothetical object. The filtering comprises smoothing an unknown skeleton by a forward propagated unknown skeleton, wherein the forward propagated unknown skeleton is generated by moving forward an old unknown skeleton along a traffic lane.

The hypothetical object is assigned one or more attributes. The one or more of the attributes are related to a possible motion state of the hypothetical object. The motion state comprises one or more of the following factors: a stationary condition, a moving condition, a speed, and a moving direction. The speed is set to less than or equal to a predetermined maximum value. The predetermined maximum value may be set to a speed limit. In some cases, the predetermined maximum value is a quantity derived from other objects concurrently or previously observed in the environment. The predetermined maximum value can be derived from historical data, road configuration, traffic rules, an event, a time, a weather condition, or a combination of two or more of them.

Implementations include accessing a database with road network information, or using data from a second set of sensors, or both. The sensor or a second set of sensors comprises one or more of the following: a radar sensor, a lidar sensor, and a camera sensor. A camera sensor may be a stereo camera sensor, a monocular camera sensor, or both.

Generating the commands for operating the vehicle includes updating a trajectory for the vehicle, or executing the trajectory for the vehicle, or both. The vehicle comprises an autonomous vehicle.

In general, in an aspect, technologies generate commands to cause an autonomous vehicle to drive on a road network at specified speeds and make specified turns to reach a goal position. The commands are updated in response to current data representing a hypothetical speed and moving direction of a hypothetical vehicle also being driven on the road network The commands are updated to reduce a risk of the autonomous vehicle colliding with another vehicle on the road network. The hypothetical speed and moving direction is probabilistically derived based on vehicles previously observed in the environment.

The observable part and the non-observable part are separated by a boundary. Implementations include detecting of the boundary. Detecting of the boundary uses data from one or more sensors to distinguish an observable ground from a foreground that obscures a portion of the ground. The one or more sensors comprise sensors onboard the autonomous vehicle, or sensors offboard the autonomous vehicle, or both.

The current data representing a hypothetical speed and moving direction of a hypothetical vehicle may be generated based on known objects perceived by one or more sensors. In some cases, the data generation includes one or more of the following operations: querying traffic lane information from a road network database, using stored data to infer a possible location of the hypothetical vehicle, and determining a location of the autonomous vehicle based on a road network database and one or more sensors. Inferring the possible location of the hypothetical vehicle includes querying traffic lane information from a database and discretizing the traffic lane into discretized points, generating an unknown skeleton of discretized points of a lane that cannot be perceived by sensors, generating a representative shape at a discretized point of the unknown skeleton, and evaluating if the representative shape is completely within the unperceived world. A representative shape within the unperceived world is treated as the hypothetical vehicle.

The technologies may apply temporal filtering to determine the location of the hypothetical vehicle. The filtering process smoothes an unknown skeleton by a forward propagated unknown skeleton, wherein the forward propagated unknown skeleton is generated by moving forward an old unknown skeleton along a traffic lane.

The hypothetical vehicle is assigned one or more attributes. The one or more of the attributes are related to a possible motion state of the hypothetical vehicle. The motion state comprises a stationary condition. The hypothetical speed is set to less than or equal to a predetermined maximum value. The predetermined maximum value may be a speed limit or a computationally derived quant. The quantity can be derived from other objects concurrently or previously observed in the environment. The quantity can be derived from historical data, road configuration, traffic rules, an event, a time, a weather condition, or a combination of two or more of them.

Implementations have access a database with road network information. Data from one or more sensors is used. The one or more sensors include a radar sensor, or a lidar sensor, or a camera sensor, or a combination of two or more of them. The camera sensor comprises a stereo camera sensor, or a monocular camera sensor, or both.

In general, in an aspect, technologies include an apparatus comprising an autonomous vehicle. The autonomous vehicle comprises controllable devices configured to cause the autonomous vehicle to move on a road network; a controller to provide commands to the controllable devices; and a computational element to update the commands in response to current data representing a hypothetical speed and moving direction of a hypothetical vehicle also being driven on the road network. The hypothetical speed and moving direction is probabilistically derived based on vehicles previously observed in the environment.

The observable part and the non-observable part are separated by a boundary. The computational element detects the boundary. Detecting of the boundary comprises using data from one or more sensors to distinguish an observable ground from a foreground that obscures a portion of the ground. The one or more sensors comprise sensors onboard the autonomous vehicle, sensors offboard the autonomous vehicle, or both.

Generating the current data representing a hypothetical speed and moving direction of a hypothetical vehicle may be based on known objects perceived by one or more sensors.

In some cases, the data generation includes one or more of the following operations: querying traffic lane information from a road network database, using stored data to infer a possible location of the hypothetical vehicle, and determining a location of the autonomous vehicle based on a road network database and one or more sensors. Inferring the possible location of the hypothetical vehicle includes querying traffic lane information from a database and discretizing the traffic lane into discretized points, generating an unknown skeleton of discretized points of a lane that cannot be perceived by sensors, generating a representative shape at a discretized point of the unknown skeleton, and evaluating if the representative shape is completely within the unperceived world. A representative shape within the unperceived world is treated as the hypothetical vehicle.

The technologies may apply temporal filtering to determine the location of the hypothetical vehicle. The filtering process smoothes an unknown skeleton by a forward propagated unknown skeleton, wherein the forward propagated unknown skeleton is generated by moving forward an old unknown skeleton along a traffic lane.

The hypothetical vehicle is assigned one or more attributes. The one or more of the attributes are related to a possible motion state of the hypothetical vehicle. The motion state comprises a stationary condition. The hypothetical speed is set to less than or equal to a predetermined maximum value. The predetermined maximum value may be a speed limit or a computationally derived quantity. The quantity can be derived from other objects concurrently or previously observed in the environment. The quantity can be derived from historical data, road configuration, traffic rules, an event, a time, a weather condition, or a combination of two or more of them.

The computational element accesses a database with road network information. Data from one or more sensors is used. The one or more sensors include a radar sensor, or a lidar sensor, or a camera sensor, or a combination of two or more of them. The camera sensor comprises a stereo camera sensor, or a monocular camera sensor, or both.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 1:
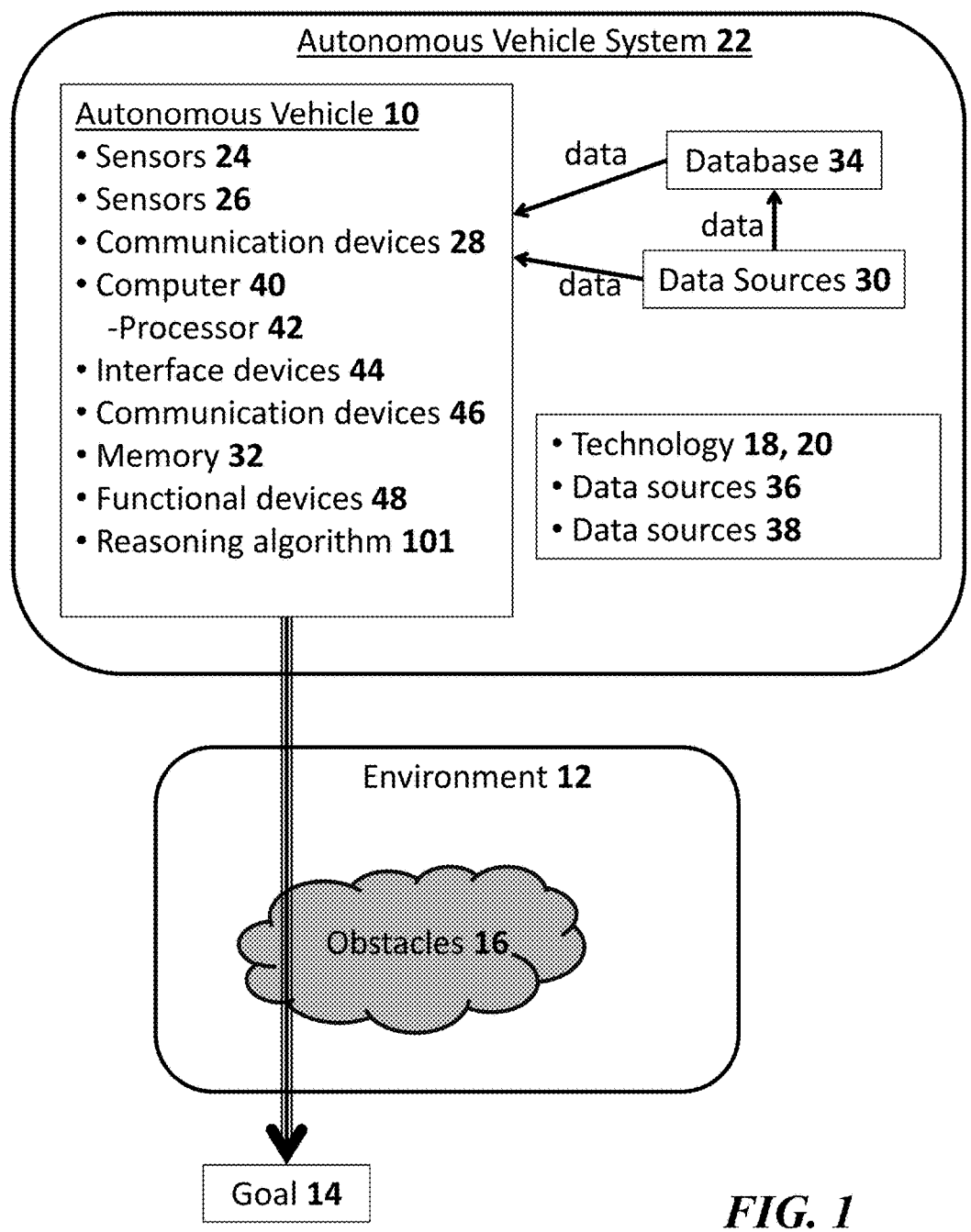
FIG. 1 shows an example of an AV system.

The phrase "environment of an AV" is used in this document to broadly include, for example, the area, geography, locale, vicinity, or road configuration in which the AV is located or driving including the road network and features, the built environment, the current conditions, and objects that are in the environment. This document sometimes uses the term "world" interchangeably with "environment."

The term "trajectory" is used herein to broadly include any path or route from one place to another, for example, a path from a pickup location to a drop off location.

The term "traffic lane" is used herein to broadly include any type of lane (e.g., unpaved surface, sidewalk, crossings, pedestrian walks, road, street, highway, freeway, truckway, vehicle lane, bicycle lane, bus lane, tram lane, rail road, acceleration lane, merge lane, deceleration lane, turn lane, passing lane, climbing land, crawler lane, operational lane, auxiliary lane, ramp, shoulder, emergency lane, breakdown lane, transfer lane, express lane, collector lane, dedicated lane, carpool lane, toll lane, parking lane, fire lane, and slow lane) for a moving object to travel.

The term "object" is used in this document to broadly include vehicles (e.g., cars, wagons, trucks, buses, bicycles, motorcycles, trains, trams, watercrafts, aircrafts, and spacecrafts), people, animals, signs, poles, curbs, traffic cones, barriers, mobile signs, trees, bushes, greenspaces, parks, railroads, worksites, stones, boulders, tombs, rivers, lakes, ponds, floods, logs, grasslands, snowbanks, deserts, sands, buildings, and obstacles.

The term "world model" is used in this document to broadly include a representation of an environment of an AV.

The term "area" is used in this document broadly to include, for example, a physical region in an environment of an AV, regardless of presence or absence of an object.

The term "perceived world" is used in this document to broadly refer to areas or objects or attributes of areas or objects or a combination of areas or objects or attributes that are perceived or observed or known in an environment.

The term "unperceived world" is used in this document to broadly refer to areas or objects or attributes of areas or objects or a combination of areas or objects or attributes that are unperceivable or non-observable or unknown in an environment.

The term "dark object" is used herein to broadly include an unknown object in the unperceived world. Information in a world model about dark objects of the unperceived world may be inferred or simulated or imagined or generated. This document sometimes uses the term "unknown object" interchangeably with "dark object."

The term "goal" or "goal position" is used herein to broadly include a place to be reached by an AV, including, for example, an interim drop off location, a final drop off location, and a destination, among others.

Although this document describes technologies based on AVs, the technologies are equally applicable to semi-autonomous vehicles, such as so-called Level 2 and Level 3 vehicles (see SAE International's standard J3016: Taxonomy and Definitions for Terms Related to On-Road Motor Vehicle Automated Driving Systems, which is incorporated by reference in its entirety, for more details on the classification of levels of autonomy in vehicles) which attempt to control the steering or speed of a vehicle. The Level 2 and Level 3 systems may automate certain vehicle operations, such as steering and braking, under certain driving conditions based on analysis of sensor inputs. Level 2 and Level 3 systems in the market typically solely reason about the perceived world, for example, about obstacles that are directly perceived by vehicle sensors during the decision making process. The technologies described in this document can benefit the semi-autonomous vehicles. Further, the technologies described in this document also can assist driving decisions of human-operated vehicles.

AVs

As shown in FIG. 1, a typical activity of an AV 10 is to safely and reliably drive autonomously through an environment 12 to a goal position 14, while avoiding vehicles, pedestrians, cyclists, and other obstacles 16 and obeying rules of the road. The AV's ability to perform this activity often is referred to as an autonomous driving capability.

The autonomous driving capability of an AV typically is supported by an array of technologies 18 and 20, (e.g., hardware, software, and stored and real time data) that this document together refers to as an AV system 22. In some implementations, one or some or all of the technologies are onboard the AV. In some cases, one or some or all of the technologies are at another location such as at a server (e.g., in a cloud computing infrastructure). Components of an AV system can include one or more or all of the following (among others).

1. Memory 32 for storing machine instructions and various types of data.
2. One or more sensors 24 for measuring or inferring or both properties of the AV's state and condition, such as the vehicle's position, linear and angular velocity and acceleration, and heading (i.e., orientation of the leading end of the AV). For example, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.
3. One or more sensors 26 for measuring properties of the AV's environment. For example, such sensors can include, but are not limited to: LIDAR; RADAR; monocular or stereo video cameras in the visible light, infrared and/or thermal spectra; ultrasonic sensors; time-of-flight (TOF) depth sensors; and temperature and rain sensors.
4. One or more devices 28 for communicating measured or inferred or both properties of other vehicles' states and conditions, such as positions, linear and angular velocities, linear and angular accelerations, and linear and angular headings. These devices include Vehicle-to-Vehicle (V2V) and Vehicle-to-Infrastructure (V2I) communication devices, and devices for wireless communications over point-to-point or ad-hoc networks or both. The devices can operate across the electromagnetic spectrum (including radio and optical communications) or other media (e.g., acoustic communications).
5. One or more data sources 30 for providing historical, or real-time, or predictive information, or a combination of any two or more of them about the environment 12, including, for example, traffic congestion updates and weather conditions. Such data may be stored on a memory storage unit 32 on the vehicle or transmitted to the vehicle via wireless communications from a remote database 34.
6. One or more data sources 36 for providing digital road map data drawn from GIS databases, potentially including on or more of the following: high-precision maps of the roadway geometric properties; maps describing road network connectivity properties; maps describing roadway physical properties (such as the number of vehicular and cyclist traffic lanes, lane width, lane traffic direction, lane marker type and location); and maps describing the spatial locations of road features such as crosswalks, traffic signs of various types (e.g., stop, yield) and traffic signals of various types (e.g., red-yellow-green indicators, flashing yellow or red indicators, right or left turn arrows). Such data may be stored on a memory storage unit 32 on the AV, or transmitted to the AV by wireless communication from a remotely located database, or a combination of the two.
7. One or more data sources 38 for providing historical information about driving properties (e.g., typical speed and acceleration profiles) of vehicles that have previously traveled along local road sections at similar times of day. Such data may be stored on a memory storage unit 32 on the AV, or transmitted to the AV by wireless communication from a remotely located database 34, or a combination of the two.
8. One or more computer systems 40 located on the AV for executing algorithms (e.g., processes 42) for the on-line (that is, real-time on board) generation of control actions based on both real-time sensor data and prior information, allowing an AV to execute its autonomous driving capability.
9. One or more interface devices 44 (e.g., displays, mouses, track points, keyboards, touchscreens, speakers, biometric readers, and gesture readers) coupled to the computer system 40 for providing information and alerts of various types to, and to receive input from, occupants of the AV. The coupling may be wireless or wired. Any two or more of the interface devices may be integrated into a single one.
10. One or more wireless communication devices 46 for transmitting data from a remotely located database 34 to the AV and to transmit vehicle sensor data or data related to driving performance to a remotely located database 34.
11. Functional devices and AV features 48 that are instrumented to receive and act on commands for driving (e.g., steering, acceleration, deceleration, gear selection) and for auxiliary functions (e.g., turn indicator activation) from the computer system.
12. Reasoning algorithm 101 for analyzing information regarding perceived world and unperceived world.

World Model

In implementations involving the operation of an AV, the AV is designed to be driven without direct human control or supervisory input through an environment, while avoiding collisions with obstacles and obeying the rules of the road (e.g., rules of operation or driving preferences). To accomplish such autonomous driving, the AV (or more specifically, the computer system or data processing equipment associated with, in some cases attached to, the vehicle) or the AV system first typically constructs a world model.

In some implementations, a world model includes a representation of an environment of the AV, e.g., constructed using data from a geolocation device, or a map, or a geographic information system, or a combination of two or more of them, and from sensors that observe any areas or objects. To construct the world model, an AV system collects data from a variety of sensors (e.g., LIDAR, monocular or stereoscopic cameras, and RADAR) that are mounted to or attached to or placed inside the AV, or offboard the AV. In some cases, data is collected from some sensors that are not on or within the AV, for instance, from another vehicle, buildings, traffic lights, street light, a person's mobile phone, or a combination of them, in the neighborhood or in a remote location. Then, the AV system analyzes the collected data to extract information (e.g., positions and motion properties) about areas and objects in the environment. The AV may also rely on information gathered by onboard sensors, offboard sensors, vehicle-to-vehicle communication, vehicle-to-infrastructure communication, or information that is otherwise obtained from other data sources.

Given a world model, the AV system employs an algorithmic process to automatically generate and execute a trajectory through the environment toward a goal. The goal is provided generally by another algorithmic process that may rely on a human input or on an automatic computational analysis.

In various applications, the world model comprises representations of areas and objects in the perceived world and in the unperceived world. Objects in the perceived world include objects that are observable by sensors onboard and offboard the AV, and objects about which the AV system has information that is received from other data sources.

Sensors, regardless of types or onboard an AV or offboard an AV, usually have a limited sensing range; i.e., sensors only can observe areas or objects up to a certain extent of physical measurements, for example, distance, width, vertical extent, horizontal extent, orientation, speed, electromagnetic amplitude and frequency, audio amplitude and frequency, weight, and pressure. Areas or objects or attributes beyond limited sensing ranges of sensors may not be observable or may not be determined by the AV system. In addition, because some types of sensors collect sensing data along direct lines-of-sight, there may exist areas or objects in the environment that are occluded from the view of the sensors due to the presence of other objects in the middle of those lines-of-sight.

In some implementations, an AV system generally has information of static properties of the world (both perceived world and unperceived world), such as the road network, which typically come from one or more data sources (e.g., maps or geographic information systems or both) and the dynamic properties of objects in the perceived world. In contrast, the AV system lacks information about the dynamic status (i.e., the information about movable or moving or changing objects such as vehicles, pedestrians, animals and their attributes, e.g., positions, orientations, and velocities) of the unperceived world, so the technologies in this document present methods to deal with this lack of information about the dynamic status of the unperceived world.

In some situations, the lack of information about the unperceived world may not affect the decisions that the AV system makes. In other situations, the lack of information about the unperceived world may be critical for the AV system's decision-making. The following exemplary scenarios illustrate the situations.

In the first scenario, an AV system may be traveling on a straight road where the sensing range of its sensors in the direction of travel is not blocked by any objects. Nevertheless, the limited sensing range of sensors implies that the sensors can only perceive a limited part of the AV's environment. Areas beyond the sensing range of the sensors are part of the unperceived world. However, the sensing range of the AV's sensors may give the AV system enough information of the AV's environment to make decisions, such as at what speed to travel and when to brake to avoid collision with an object. The lack of information about the unperceived world may not affect the decisions of the AV system because a previously unobserved area or object in the unperceived world that becomes known to the AV system as it moves may be sufficiently far away from the AV, giving the AV system enough time and distance to react safely once the area or object is observed.

Figure 2:
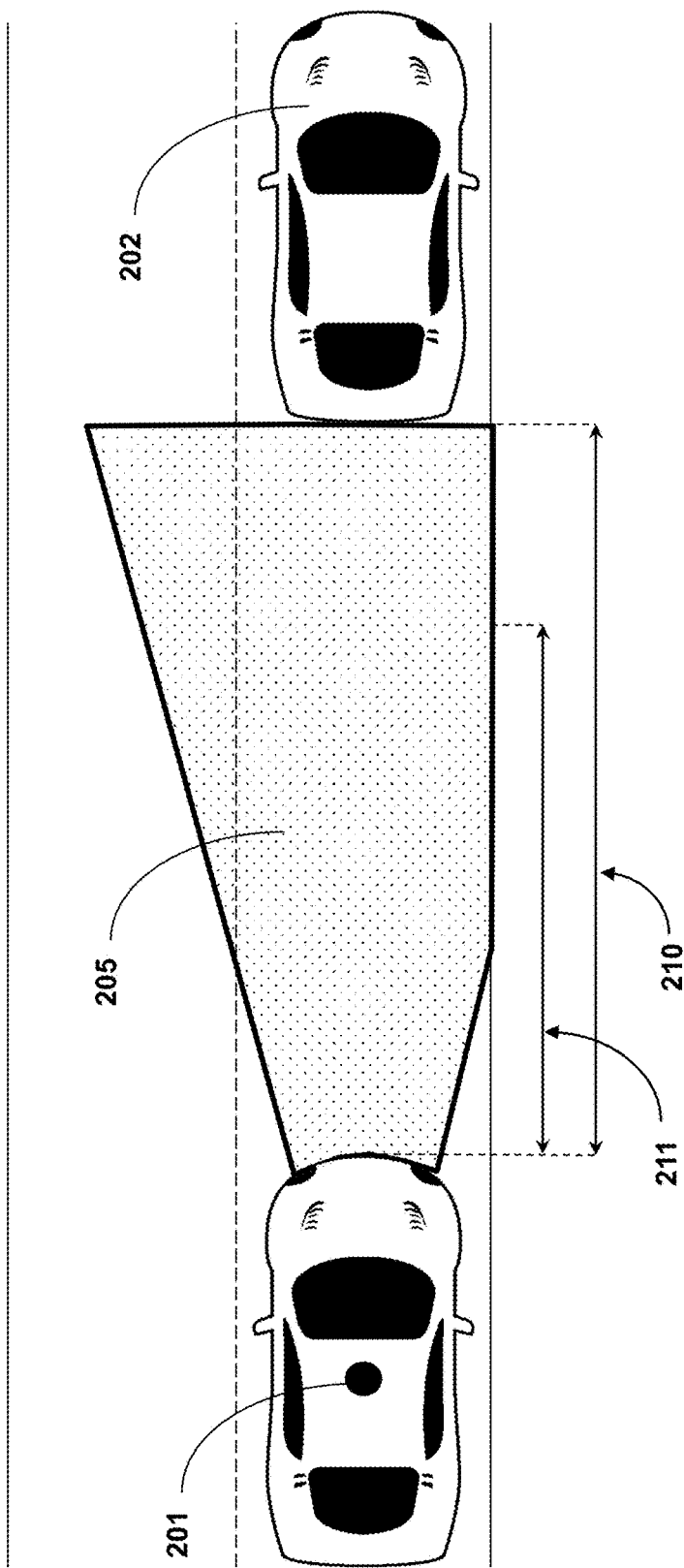
FIGS. 2 through 6 show examples of road scenarios.

FIG. 2 illustrates the first scenario. The values of the speeds and distances described in this scenario are for illustration, and the values may vary. In this example, assume that the AV 201 has a sensor with a range 210 of 200 m, is traveling at a rate of 30 m/s, and requires 150 m to come to a complete stop (i.e., stopping distance 211). The shaded area 205 denotes the portion of the world that can be observed by the sensor given its sensing range and lateral field of view, and if there is no other sensor to be considered, the shaded area denotes the perceived world of the AV. The area outside of the boundary of the shaded area is non-observable by the sensor 201 and therefore is the unperceived world. An object, such as the vehicle 202, may be present in the unperceived world at the very edge of the sensor range (e.g., 200 meters away). Even if the vehicle 202 is stopped, the presence of such an object would not affect the driving decisions of the AV system because the AV can stop once it observes the object (as the object moves from the unperceived world into the perceived world) without a risk of collision with the stationary object 202.

Figure 3:
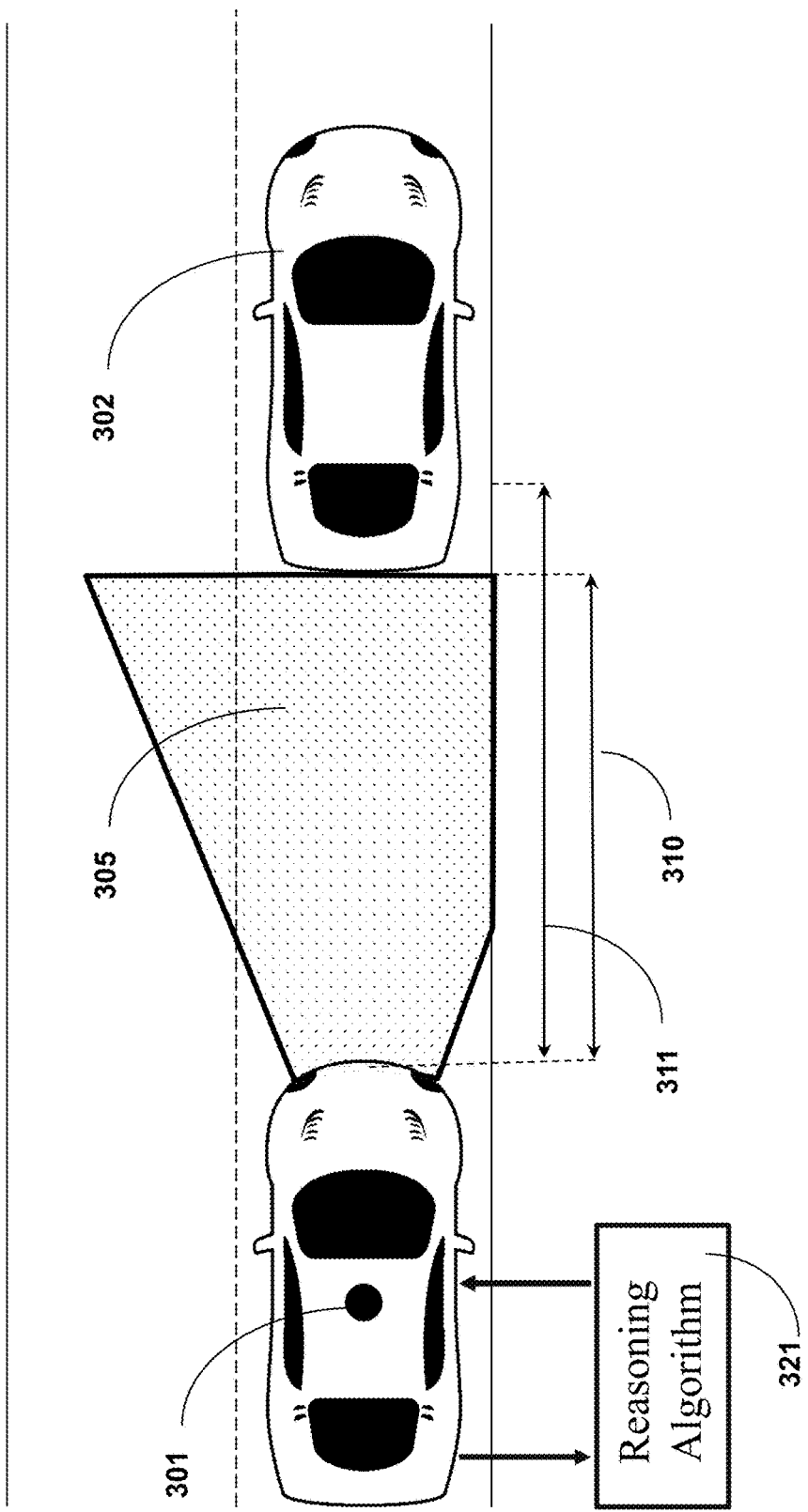

The second scenario is illustrated in FIG. 3. The values of the speeds and distances described in this scenario are for illustration, and the values may vary. This situation is similar to FIG. 2, but the sensing range of the AV system's sensors 310 is shorter, say limited to 60 m. The shaded area 305 represents the corresponding extent of the perceived world. In this situation, a stationary object, for example the vehicle 302, that is located at the boundary of the perceived world with the unperceived world may be 60 m away from the AV, which is less than the stopping distance 311 (150 m) that the AV requires in order to reach a full stop. In such a situation, the current speed of the AV, the stopping distance, and the sensing range of the sensors combine to put the AV at risk of being unable to stop before hitting an obstacle that is in the unperceived world and about to enter the perceived world. To avoid such a risk, the AV system may decide to reduce the AV's speed even before the obstacle enters the perceived world, thus shortening its stopping distance to correspond to the sensing range of the sensors and thus be able to stop before colliding with the object 302 that is located at the boundary of, or beyond, the unperceived world. Therefore, the possibility that such an object will be present in the unperceived world affects the driving decisions of the AV. Therefore, the technologies described in this document include a reasoning algorithm 321 in the AV system to provide for the possible presence of unperceived objects, even though these objects are unknown because they lie beyond the sensor range of the AV.

Figure 4:
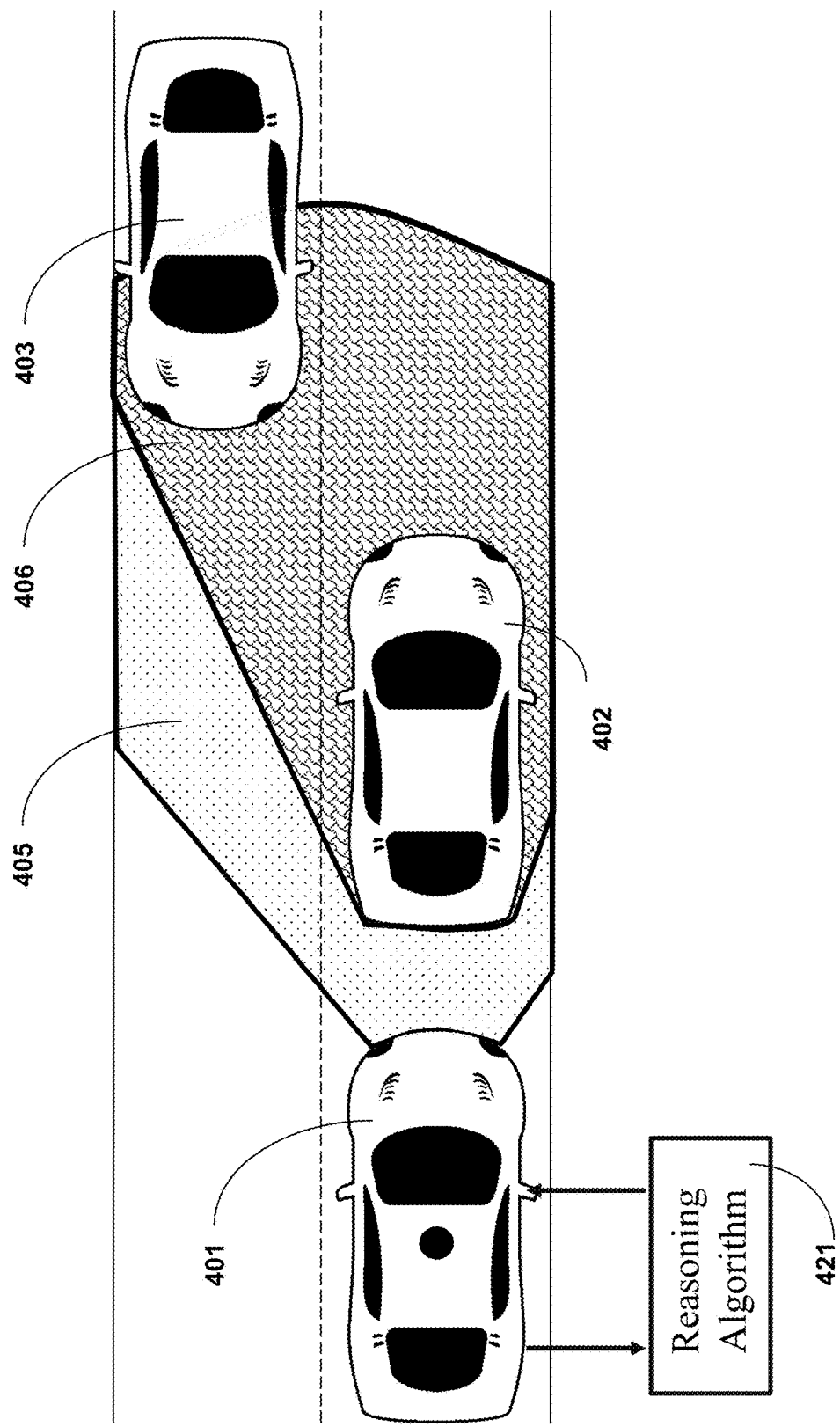

The third scenario is that the sensing range of an AV system's sensors is blocked by another moving object. Referring to FIG. 4, an AV 401 may be following another vehicle 402 (called the "leading vehicle") that is immediately ahead of the AV. In this situation, the leading vehicle may partially or fully block the sensing range of one or more of the AV's sensors, including restricting the view of traffic in the opposing traffic lane, for example. The first shaded area 405 represents a perceived world of the AV. The second shaded area 406 represents an area that is part of the unperceived world, but would have been part of the perceived world had the sensing range and lateral field of view of the AV system's sensors not been restricted by the leading vehicle 402. In FIG. 4, the vehicle 403 traveling the opposing traffic lane belongs to the unperceived world. However, part of the vehicle 403 is present in the shaded area 406, and therefore the vehicle 403 would have been perceived by the AV 401 if the AV's sensors had not been partially occluded by the leading vehicle 402. Consider, for example, a situation where the AV 401 needs to make a decision about whether to overtake the leading vehicle by temporarily crossing over into the opposing lane of traffic. In this situation, information about the unperceived world, specifically the potential presence of an obstacle in the opposing traffic lane, such as the vehicle 403, may be critical to making a safe decision about the overtaking maneuver. Therefore, the presence of such an object could affect the driving decisions of the AV 401, because the AV 401 may not be able to safely execute a passing maneuver without colliding with the obstacle. Therefore, the technologies described in this document include a reasoning algorithm 421 in the AV system to handle this scenario. In other words, the AV system could make decisions based not only on actual information of the perceived world, but also on hypothetical information about the unperceived world.

Figure 5:
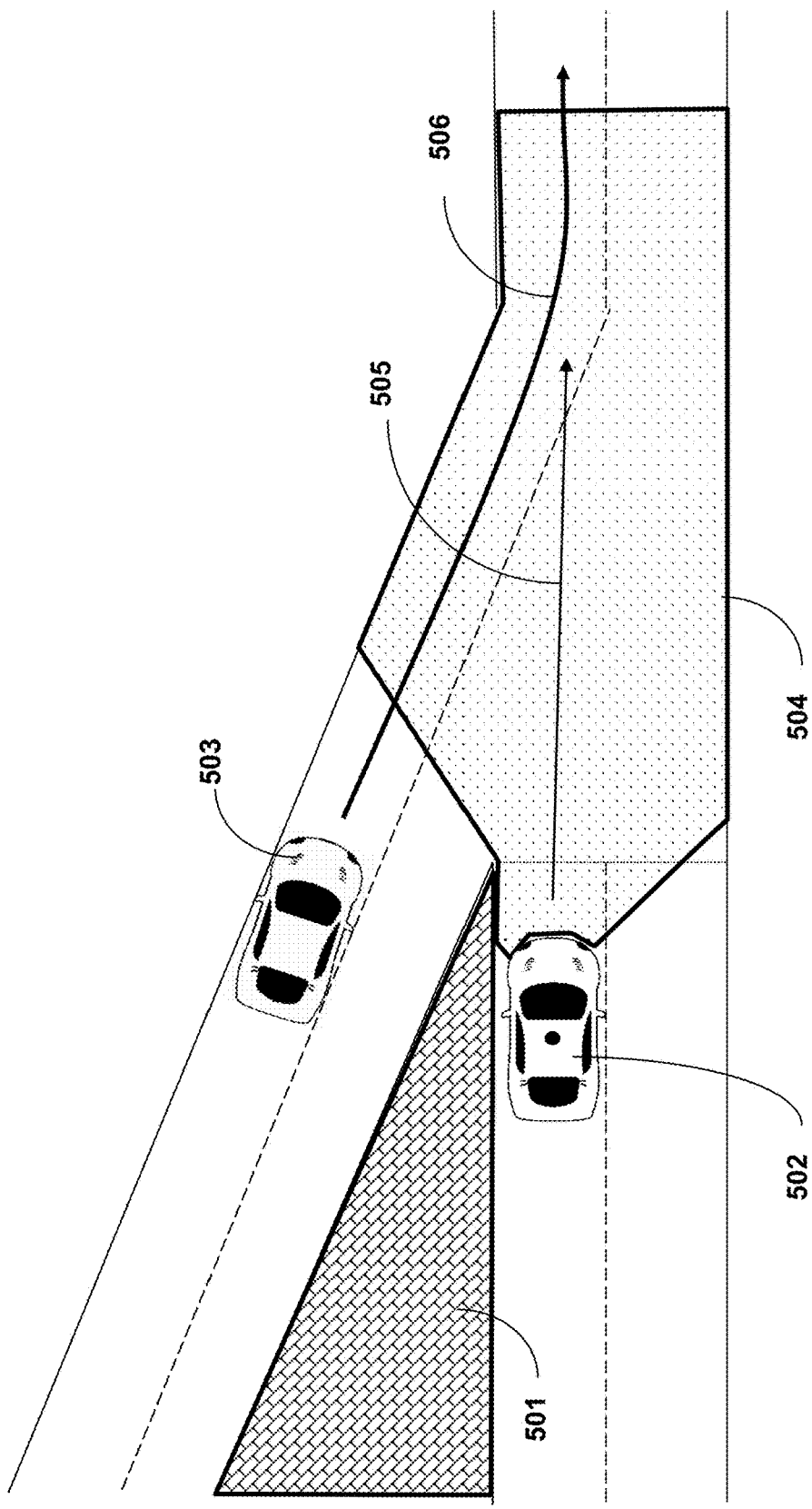

The fourth scenario is that the sensing range of an AV system's sensors is blocked by a non-moving object in its environment. For instance, there may be buildings, billboards, or other objects positioned along the road near an intersection, which limit the ability of the AV system to observe, for example, cross-traffic traveling on the intersecting road. Referring to FIG. 5, an AV 502 is approaching an intersection at which the conflicting traffic is not controlled by a traffic signal, with the intention of proceeding straight along the trajectory 505. However, part of the trajectory 505 may conflict with a trajectory 506 of another vehicle 503 traveling in another lane. Generally, the AV 502 may come to a stop if there is a STOP sign, check for and yield to any conflicting traffic, and then proceed straight. However, the presence of buildings or other objects near the road, such as the built environment 501, may partially occlude the sensing range and lateral field of view of the AV's sensors, resulting in a reduced perceived world (represented by the shaded area 504) that does not contain potentially conflicting vehicles such as 503. In such situations, the technologies described in this document may enable the AV 502 to override its normal practice of proceeding straight at normal speed if no obstacle is observed in the perceived world and, instead, reason about how to deal with the lack of information about potential objects in the unperceived world. The technologies may, for example, enable the AV to adopt the strategy of slowly moving forward to increase its sensors' sensible range and thus increase the size of its perceived world. In this sense, it is therefore important for the AV 502 to be able to reason about when its information about the perceived world is sufficient, and when potential risks in the unperceived world are insignificant, for it to safely proceed forward.

Figure 6:
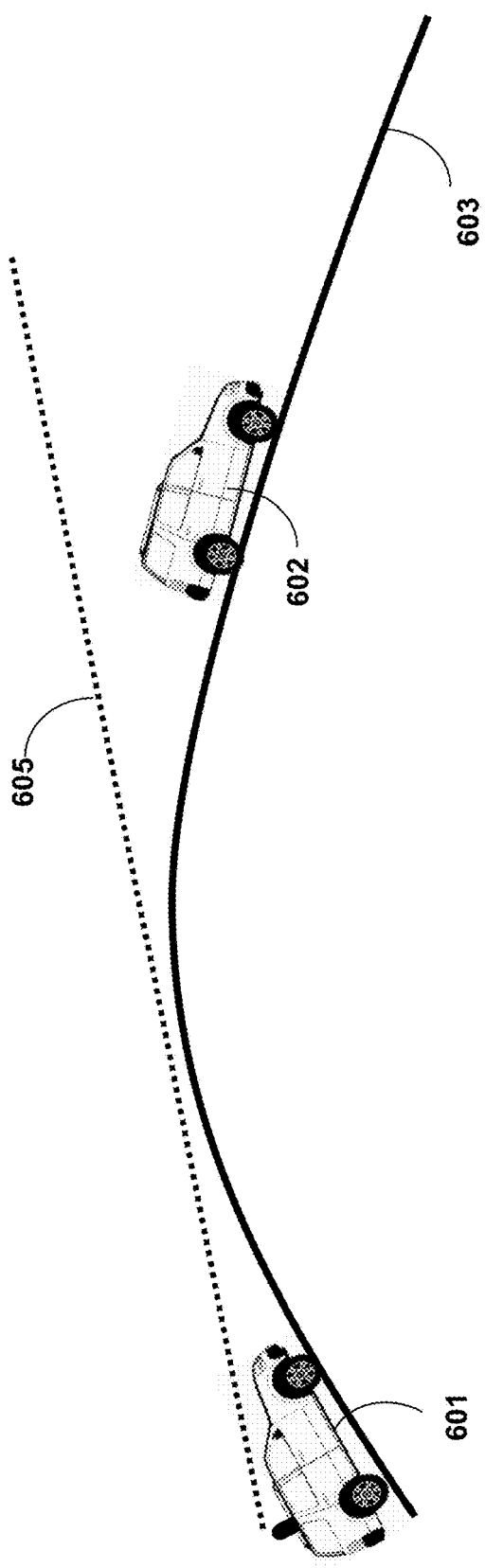

The fifth scenario is that the geometry of the road limits, for example, the vertical aspect of the sensing range of sensors regarding the environment of the perceived world. Consider a situation illustrated in FIG. 6. An AV 601 may be driving on a road segment 603 where it is approaching a crest of a steep hill. In this situation, the segment of the road just beyond the hill crest (to the right of line 605) may lie in the unperceived world, because that segment of the road cannot be observed by the AV sensors. Therefore, an object, such as the vehicle 602, on the unperceived road segment may become an obstacle for the AV 601, because the AV 601 may be unable to stop without colliding with the obstacle. The technologies described in this document enable the AV system to reason about the need to travel at a lower speed in order to have sufficient time to react to obstacles that may be present in the unperceived world.

In general, although the AV system does not have information of the unperceived world and one or more objects may be present in the unperceived world, it is important for the AV to reason about possible unknown objects in the unperceived world. The unknown objects may influence the AV system's decision-making process and the trajectory that will be chosen or adapted and executed by the AV system.

This document describes technologies for, among other things, reasoning about unknown objects that may potentially be located in the unperceived world, with the aim of improving the safety, comfort, or other aspects of the AV system's decision-making process and ultimately, the AV's operation.

Dark Objects Process

A broad idea of the technologies described in this document is for the world model to systematically generate or infer the existence of hypothetical (that is, unknown) objects in the unperceived world. The dark objects are generated or inferred, for instance, in a manner (that is to say having assumed positions, orientations, and velocities, for example) that may change the AV's speed or trajectory or other aspects of the AV system's decision making process. The dark objects process is recursively executed through a time course. The technologies help the AV system to make decisions in the face of uncertainty about the unperceived world.

Figure 7:
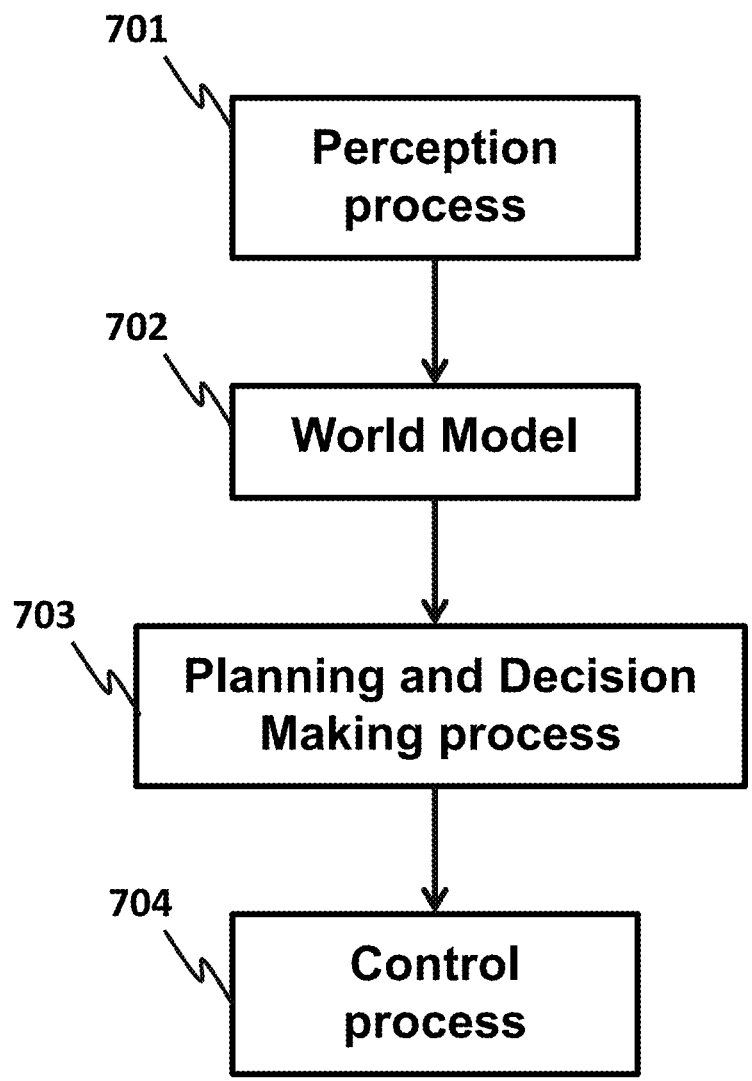
FIGS. 7 through 9 show examples of processes.

In some implementations, the autonomous driving capability of an AV is achieved by the process illustrated in FIG. 7, or a similar process. Some implementations may not use all of the operations illustrated in FIG. 7. Some implementations may divide tasks differently from the way illustrated in FIG. 7. Some implementations may include additional processes beyond those illustrated in FIG. 7. In general, an AV system starts with a perception process 701, which uses data from onboard sensors, prior information stored in databases, and other data sources to localize (e.g., determine the current position of) the AV and to create a world model 702 as of a current time. The AV system may also create one or more predicted world models as of one or more future time steps. Next, the AV system operates a planning and decision-making process 703, which uses the world model generated from the perception process to plan a trajectory in time-space to move the AV from its current position to its goal position. The trajectory must satisfy requirements related to feasibility, safety, comfort, efficiency, or other criteria or combinations of them. Next, the AV system operates a control process 704, which executes the trajectory generated by the planning process by providing low-level actuation signals needed to control the AV. These three processes 701, 703 and 704 are operated sequentially or simultaneously.

Figure 8:
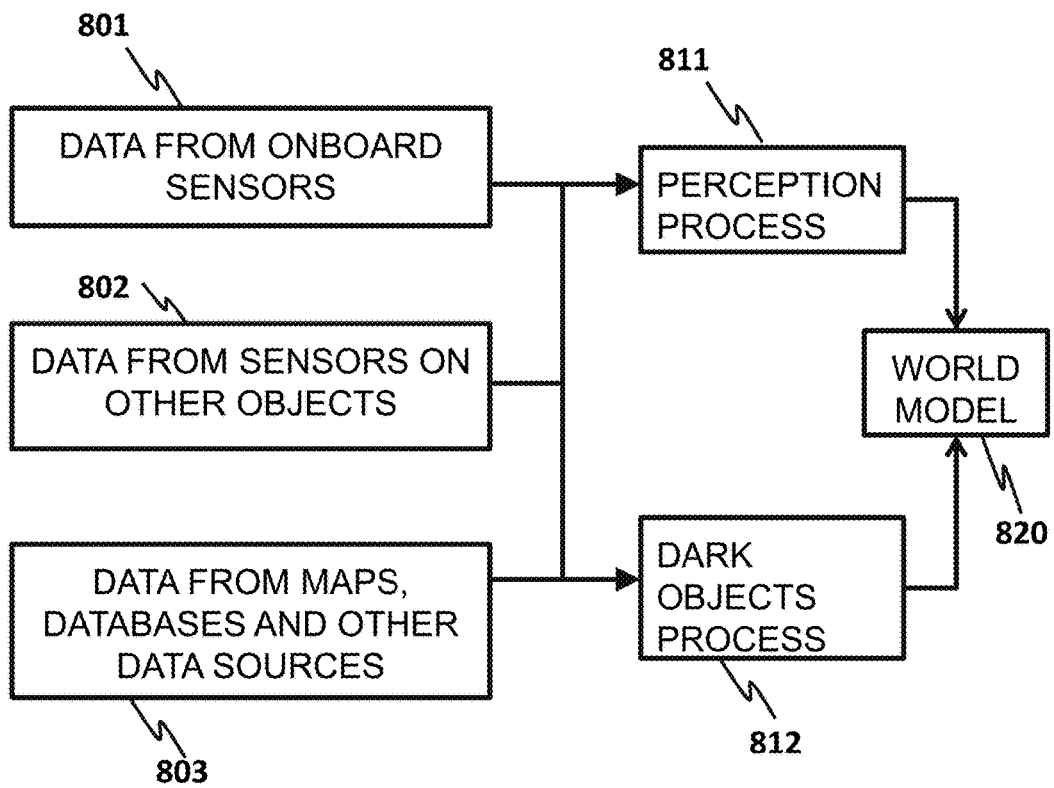

The technologies described in this document include a dark objects process for analyzing and generating hypothetical objects as part of the world model. The dark objects process runs as part of, or along with, the perception process. Referring to FIG. 8, in some implementations, the dark objects process 812 uses the same inputs as the perception process 811 and modifies the world model 820 that is outputted by the perception process 811. The inputs comprise one or more of the following: data from onboard sensors (801); data from offboard sensors, for instance on other objects (802); and data about a road network from maps, databases, and other data sources (803). This world model 820 serves as an input to the planning and decision making process in a manner that allows the planning and decision making process to reason about the unperceived world and make decisions that account for unknown objects.

Figure 9:
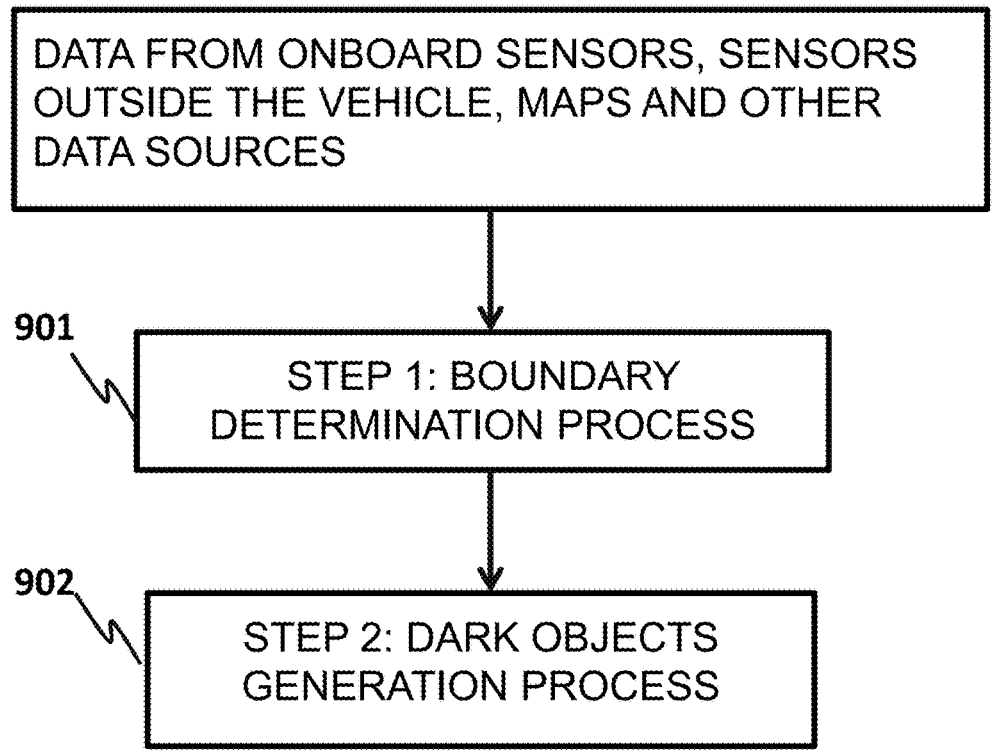

Referring to FIG. 9, in some implementations, a dark objects process comprises a boundary determination process 901 and a dark object generation process 902. The boundary determination process 901 uses data to determine a boundary between the perceived world and the unperceived world. The boundary between a perceived world and an unperceived world is computed using data from, for example, onboard sensors, offboard sensors, maps, and other data sources. The dark object generation process 902 generates hypothetical dark objects for inclusion in the world model and determines their attributes (e.g., object type, position, orientation, direction, velocity, dynamics, and statics).

Generation of a dark object may comprise, for instance, considering, for example, a worst-case scenario for the dark object being present in the unperceived world. The world model is updated with the presence and attributes of these dark objects. Then, this updated world model is passed to the planning and decision making process to generate and execute a trajectory to the goal position. Such a trajectory is planned and executed accounting for the presence of the generated dark objects. The boundary determination process and the dark objects generation process are described in more detail in the following sections.

Boundary Determination Process

As described previously, for various reasons including limited sensing range and field of view and presence of objects constraining the sensing range and field of view, an AV system's sensors may only be able to observe, or have real-time information about, a limited part of the world around it, referred to as the "perceived world". The rest of the world, that is, the complement of the perceived world, is referred to as the "unperceived world". However, some information about the unperceived world (e.g., road configuration, traffic flow, traffic lights, peak time, and corresponding historical data) may be still available from other data sources.

The boundary determination process can be applied to analyzing any type of sensors and other data. Examples of sensors include LIDAR, radar, stereo vision cameras, mono vision cameras, speed sensors, global positioning system sensors, gyrosensors, and for a combination of two or more of those or other sensors, among others. Similar processes may be devised for other sensors and for information collected from other vehicles or from sensors located in infrastructure or other locations.

Boundary determination using data from LIDAR sensors. A typical 3D LIDAR sensor returns a pointcloud with M×N points in each scan, where M is the number of beams in a vertical direction, and N is the number of beams in the horizontal direction. Each vertical slice of a scan is therefore a subarea with M×1 points along a specific bearing from the sensor. Each beam emitted from the LIDAR returns the distance to the first object that the beam encounters. The collection of such points is referred to as a pointcloud.

Figure 10:
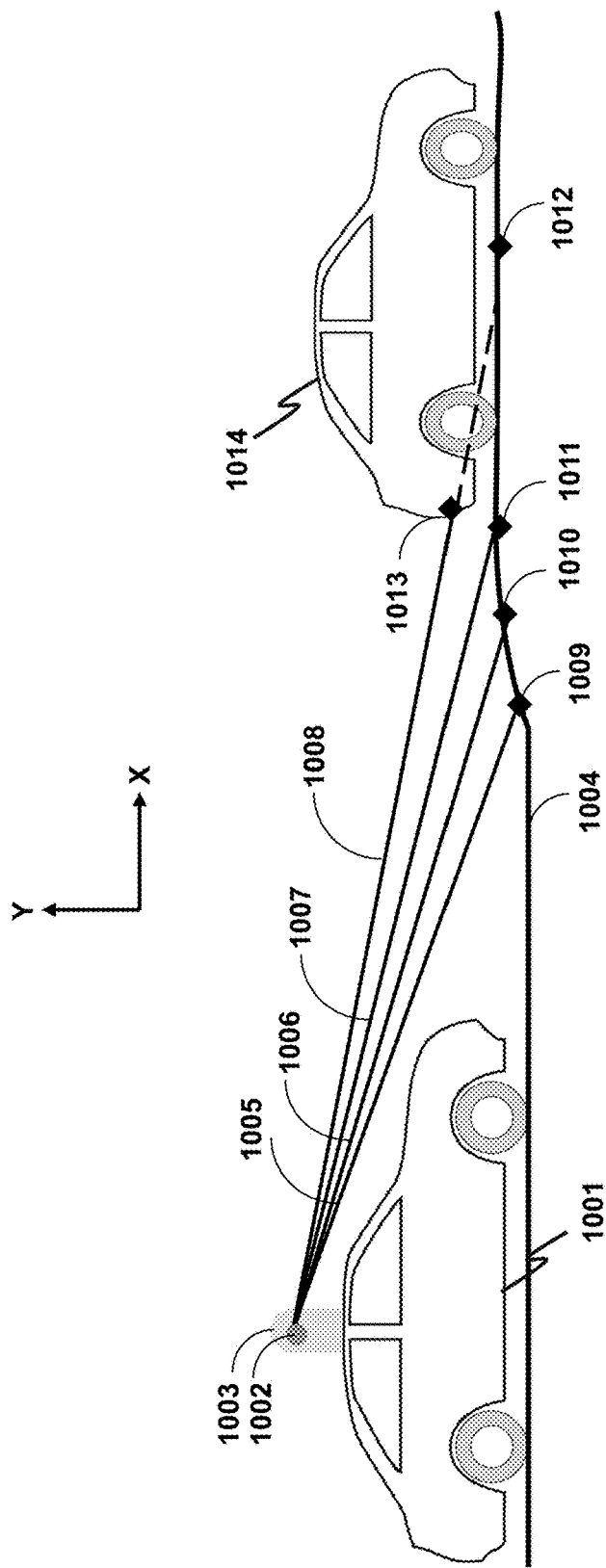
FIG. 10 shows an example of a scanning process.

A pointcloud can be analyzed to determine if each point already has been classified in an available source of data as belonging to the road surface. If not, the point is assumed to be part of foreground. Such an analyzed pointcloud may be called a "semantic pointcloud." For example, as shown in FIG. 10, if a map used by the AV system 1001 has information about an exact elevation profile of the road surface 1004, this information can be used to classify a given LIDAR point as belonging to the road surface as follows. Given information of the current position and orientation of the AV, the position of the center 1002 of the LIDAR 1003 with respect to the center of the AV, and the exact elevation profile 1004 of the road surface or more generally the ground, the AV system 1001 computes a point (1009, 1010, 1011 or 1012) at which an emitted LIDAR beam (1005, 1006, 1007, or 1008) is expected to encounter the ground. If a point (1013) returned by a LIDAR beam (1008) is closer to the AV than the expected point (1012) by a predefined difference, then the LIDAR beam may be assumed to have encountered an object 1014 (e.g., a point on the foreground), and the point 1013 may be assumed not to belong to the ground. In some implementations, a machine learning based approach (for example, deep learning) is used to perform the task of foreground classification. Such an approach may also fuse data from multiple sensors (such as LIDAR and cameras) to improve the classification accuracy.

Consider a vertical slice of a LIDAR scan with M×1 points that have been classified as described above. Assume that a vertical slice comprises four LIDAR beams (1005, 1006, 1007, and 1008), making M=4 in this case. The semantic label of each point in the semantic pointcloud is checked. If the semantic label of the first LIDAR point 1009 in this vertical slice is "ground", it is safe to assume that the space between the sensor origin and this LIDAR point is unobstructed. The subsequent points 1010 and 1011 will then be checked in order until a nearest foreground point 1013 is encountered. The space between the sensor origin 1002 and this nearest foreground point 1013 is marked as "known" in the world model. The perceived world expansion for this vertical slice will stop at the nearest foreground point 1013, and the areas behind the point 1013 will be marked "unperceived" in the world model. However, if all points have been checked in order and no foreground point is encountered, the final point of the scan is deemed a nearest foreground point, and the area beyond the final point is marked "unperceived".

The process is performed for all N vertical slices that constitute a LIDAR scan, and every foreground point is determined for each slice as detailed above. The N nearest foreground points represent sampled boundary points between the perceived world and the unperceived world.

In some embodiments, a boundary in the 3-D space can be constructed by interpolating and extrapolating the sampled boundary points. Consider, for example, the situation illustrated in FIG. 11. A LIDAR 1110 is mounted on an AV 1100, and the LIDAR 1110 makes N=3 scans and determines sampled boundary points 1101, 1102 and 1103. An exemplary 1-D boundary (denoted as 1101-1102-1103) may be constructed by drawing lines 1104 and 1105. If the LIDAR is able to perform a 360-degree scan, this boundary may be completed by joining the sampled boundary points as a contour. If the LIDAR does not perform a 360-degree scan (such as the one shown in FIG. 11), the boundary 1101-1102-1103 may be extended by drawing a line 1106 from one end point 1103 of the 1-D boundary to the center 1110 of the LIDAR and another line 1107 from the center 1110 of the LIDAR to the other end point 1101. The extended boundary becomes a polygon, denoted as 1110-1101-1102-1103-1110. The area inside the boundary 1110-1101-1102-1103-1110 (i.e., the shaded area 1109 in FIG. 11) is deemed to be a perceived world relative to the LIDAR and map data. The area 1111 outside of the boundary is the unperceived world. This boundary determination method is expected to perform well when the number of foreground points (N) is large, that is, when the LIDAR has a relatively high resolution.

In some implementations, a boundary may be constructed using curves among foreground points instead of straight lines. Various algorithms (e.g., polynomial curve fitting, Bezier curves, etc.) can be applied for boundary construction.

Figure 11:
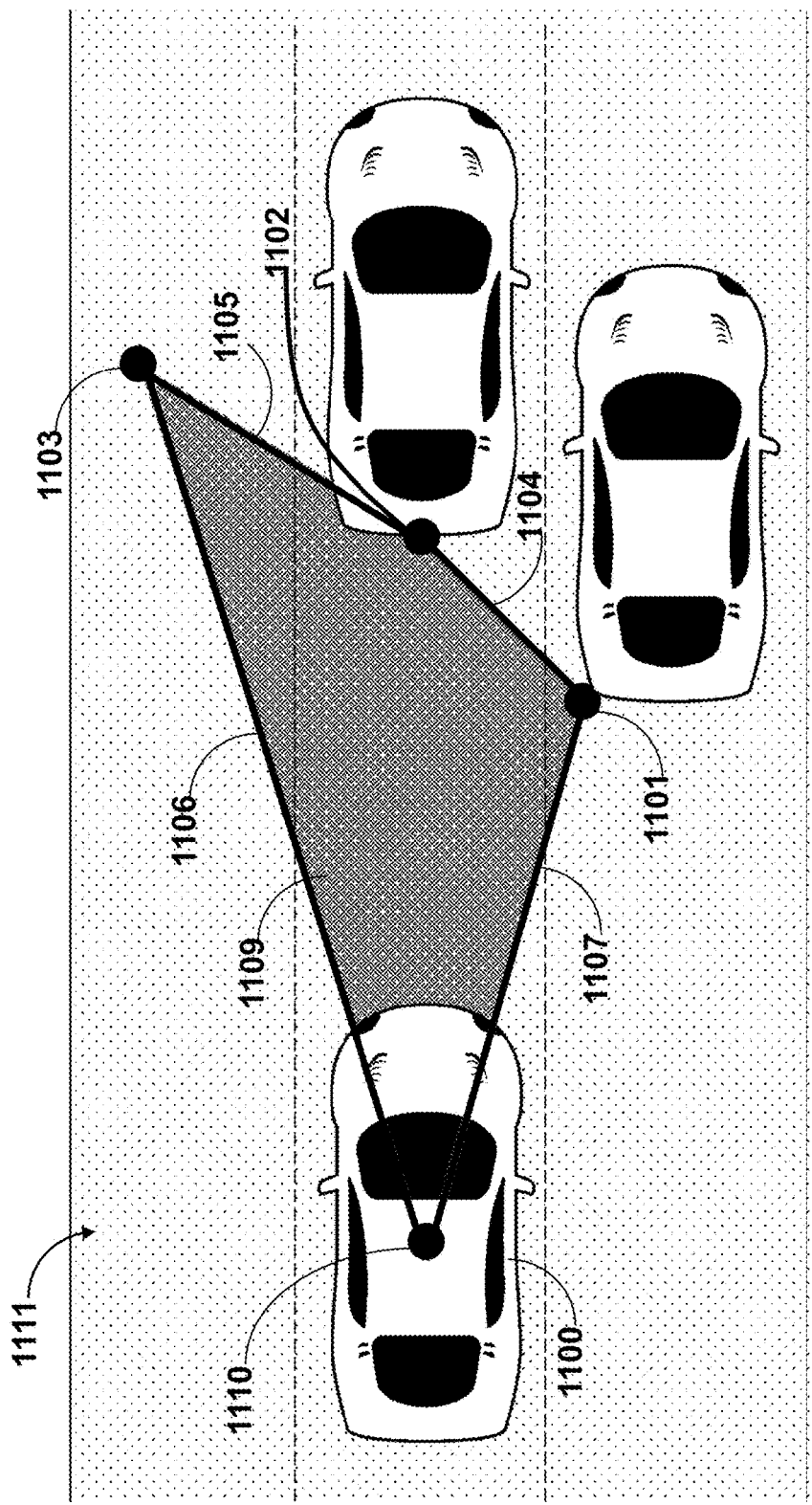
FIGS. 11 through 15 show examples of boundary determinations.

While the above description of FIG. 11 constructs the 1-D boundary, the technologies can be extended to determining a 2-D boundary between perceived world and unperceived world. For example, 2-D patches (e.g., flat or bendable) can be interpolated between points 1101, 1102, 1103 and 1110, and their union leads to a 2-D boundary.

Figure 12:
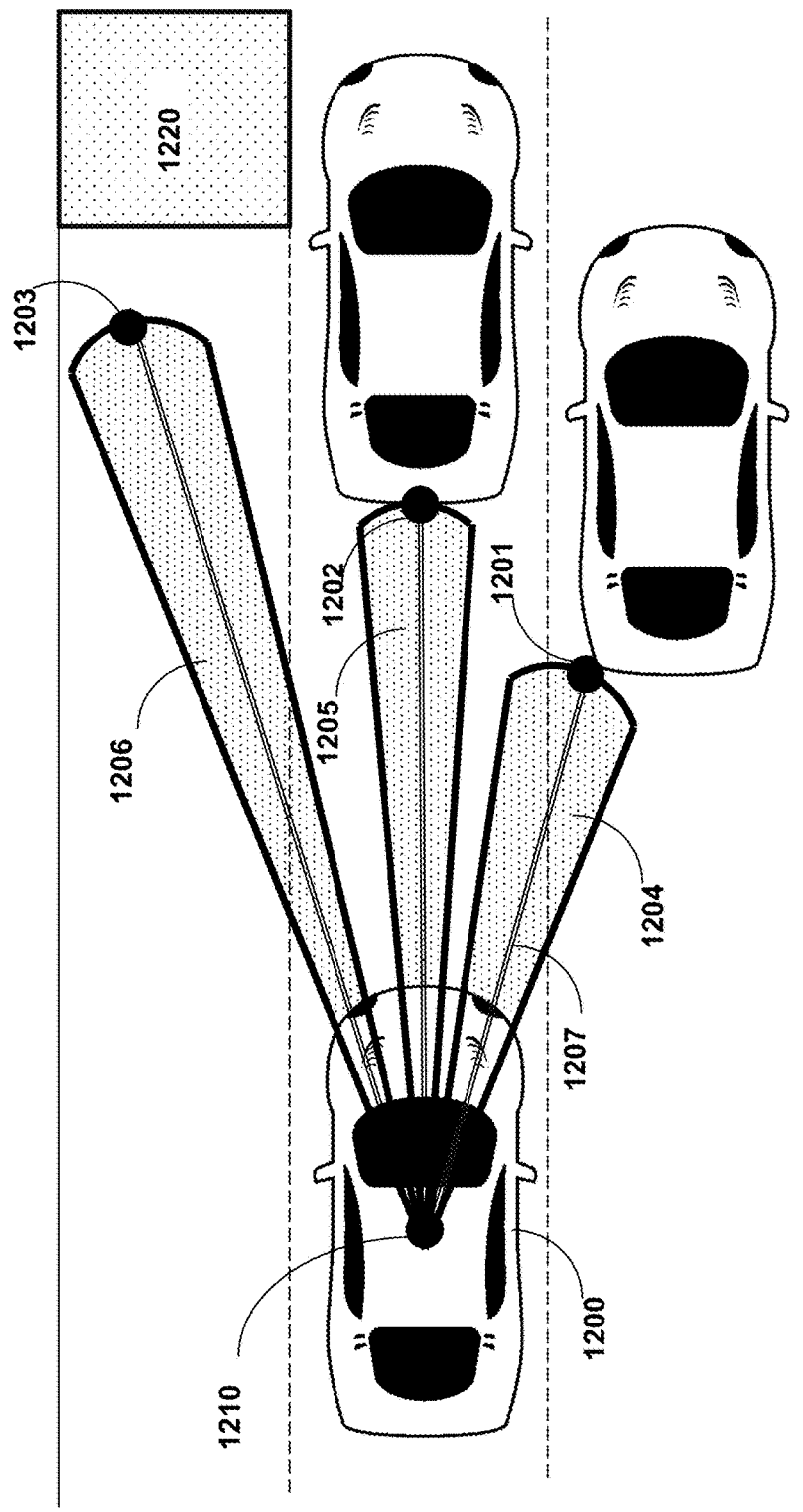

In some applications, a perceived world is constructed as a union of multiple perceived areas, one for each vertical slice. The boundary is then defined as the boundary of the union of the perceived areas. Consider for example a situation illustrated in FIG. 12, where a LIDAR 1210 is mounted on an AV 1200. The LIDAR 1210 makes vertical slices and identifies boundary sample points 1201, 1202 and 1203. For each of these points, a buffer may be constructed in the vicinity of the slice to represent the perceived area corresponding to that slice. For instance, the perceived area 1204 is constructed as a circular sector based on the point 1201. The central radius of the sector is the line 1207 joining the point 1201 to the center of the LIDAR 1210. The sector is defined by sweeping a predefined angle theta on each side of this central radius. The angle of sweep, theta, may be determined by various factors, including the horizontal resolution of the LIDAR sensor 1210. This process is repeated for points 1202 and 1203, resulting in perceived areas 1205 and 1206 respectively. The complete perceived world is then defined as the union of the three perceived areas 1204, 1205 and 1206, and the boundary of this union may then be computed.

The boundary determination method can take into account additional factors or information. For instance, the boundary sample points are not limited to the nearest foreground points, but can be based on second-, third-, fourth-, or Z-th found foreground points. In some cases, a perceived area by another sensor, onboard AV or offboard AV, can be integrated into a perceived world; for example, referring to FIG. 12, the area 1220 is determined to be a perceived area by a sensor on another vehicle or by the AV 1200 itself at an earlier processing cycle, and the AV 1200 may expand its perceived world by including the perceived area 1220.

Boundary determination using data from RADAR sensors. RADAR measurements are similar to the LIDAR measurements. The primary difference between LIDAR and RADAR sensors is that while the LIDAR sensor returns the distance to the first object encountered by a beam, a RADAR sensor may be able to return the distance to more than one object in the path of a beam, because of the ability of RADAR beams to pass through certain Objects.

Figure 13:
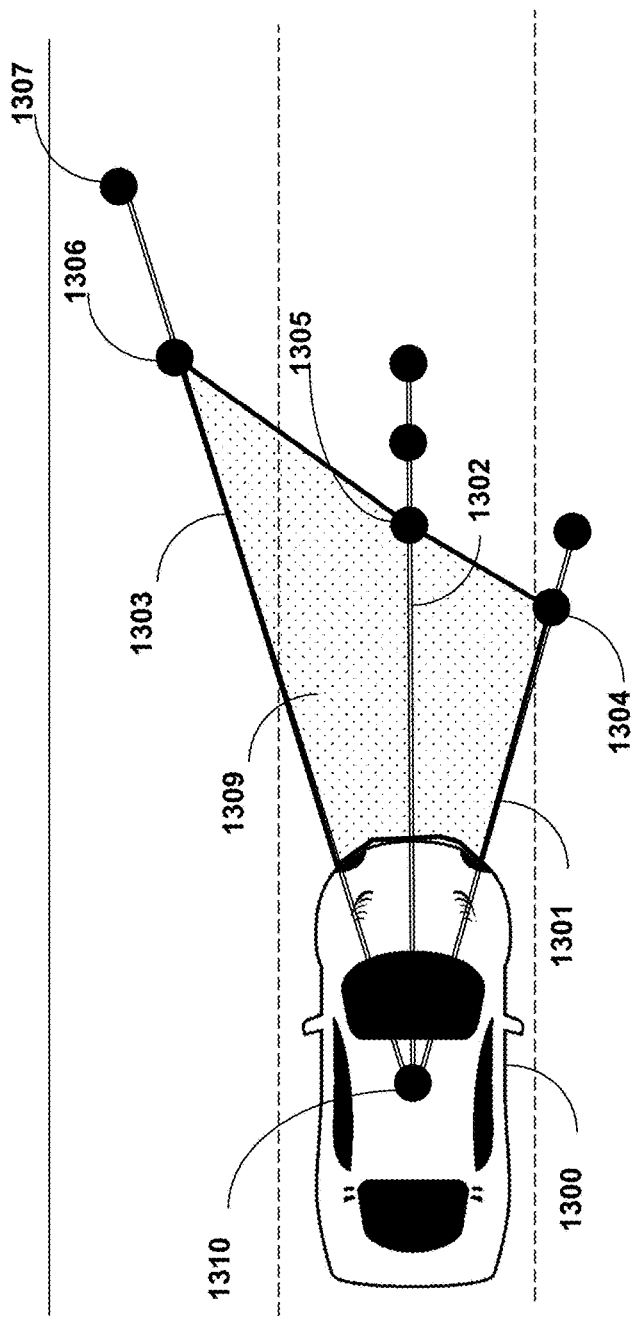

Given these similarities, the method described above may also be used for boundary determination using RADAR measurements, by applying, for example, the following adaptation: if a radar beam returns multiple foreground points in response to encountering multiple objects, the closest point may be designated as a sampled boundary point for further boundary construction. For example, consider the situation shown in FIG. 13, where a RADAR 1310 mounted on an AV 1300 shoots three beams 1301, 1302 and 1303. Each of these beams returns multiple foreground points, denoted by the black dots; for example, the beam 1303 receives returning points 1306 and 1307. Therefore, for individual beams 1301, 1302 and 1303, the AV system designates the closest points (respectively 1304, 1305 and 1306) as the sampled boundary points for determining the boundary between the perceived world and unperceived world using the methods described above, for example, as illustrated by the shaded area 1309 in FIG. 13.

Boundary determination using data from stereo camera sensors. In comparison to RADAR and LIDAR sensors, stereo cameras output denser pointclouds, especially for the overlapping part between a pair of acquired images. Semantic labeling of a pointcloud may be performed as described earlier (for example, using deep learning) to distinguish foreground points and background points. A stereo camera setup comprises two or more cameras. One of the cameras is designated as the origin of the light beams for the semantically labeled pointcloud, and the pointcloud is processed in a similar manner as for pointclouds from LIDAR scans. Each of the labeled points may then be projected onto the ground surface, and sampled boundary points may then be identified.

Figure 14:
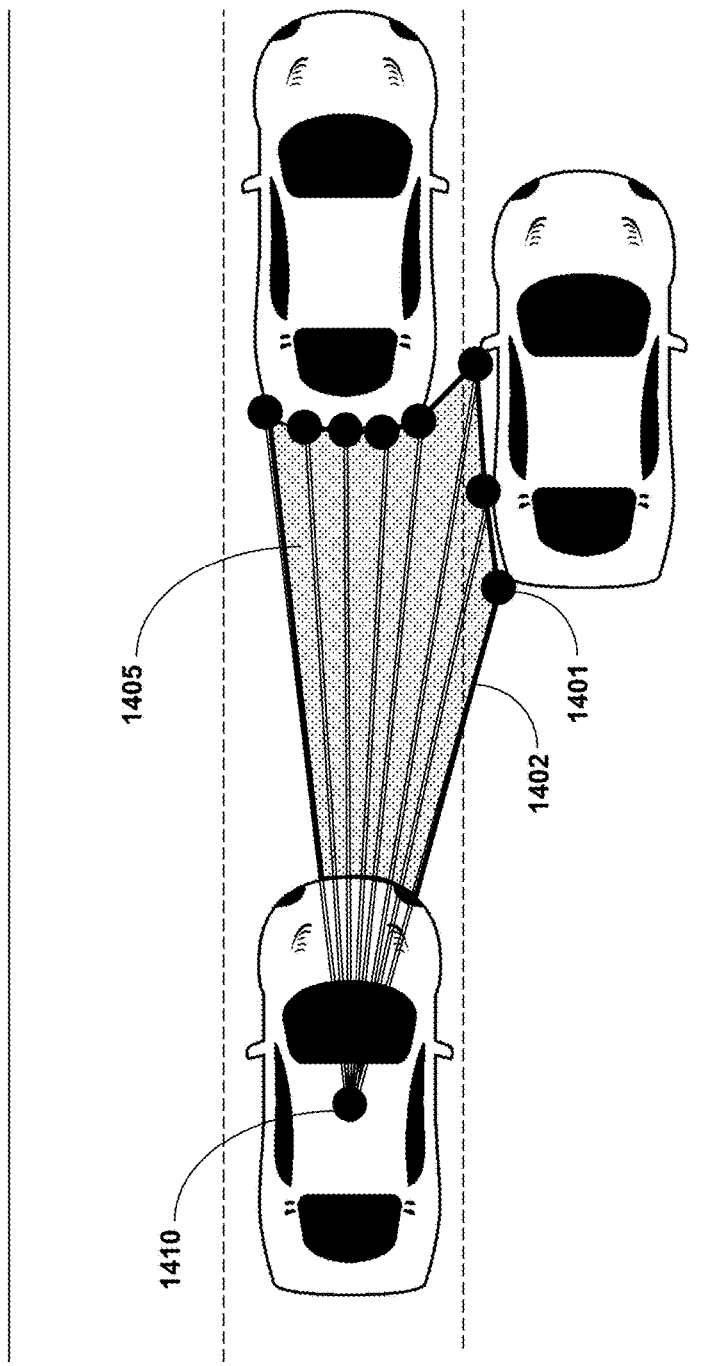

FIG. 14 illustrates a boundary determination based on stereo camera sensors. Lines (e.g., 1402) represent vertical slices going out of the stereo camera 1410. After the pointcloud has been semantically labeled and projected onto the ground plane, the black dots (e.g., 1401) represent the nearest foreground point encountered along the corresponding slices (e.g., point 1401 corresponding to the slice 1402). Once the nearest foreground point for each slice has been determined, the techniques described previously may be used to determine the boundary between the known and unperceived worlds, for example as illustrated by the shaded area 1405 in FIG. 14.

Boundary determination using data from monocular camera sensors. The boundary determination process for monocular camera images includes two steps as described below. The first step performs semantic labeling on an image to distinguish the ground (e.g., the road surface) from the foreground. As mentioned previously, this step can be based on classification and machine learning algorithms. The output of this step is an image in which pixels representing the observable road surface are distinguished from pixels representing the foreground. The observable road surface represents a perceived world, and everything else is assumed to belong to an unperceived world. Therefore, the boundary between the perceived world and unperceived world can be computed in the pixel space.

The second step of the process is known as inverse perspective mapping. Given information of the camera's intrinsic properties (e.g., focal length) and extrinsic properties (e.g., the position and angle of the camera relative to the AV, and the AV's position in the world model derived by localization), a homograph transform can be performed to map the 2-D image plane in the pixel space to the road surface plane in the 3-D metric space. By performing inverse perspective mapping, the boundary between the known and the unperceived worlds which was earlier estimated in the pixel space, is mapped to the 3-D metric space.

Figure 15:
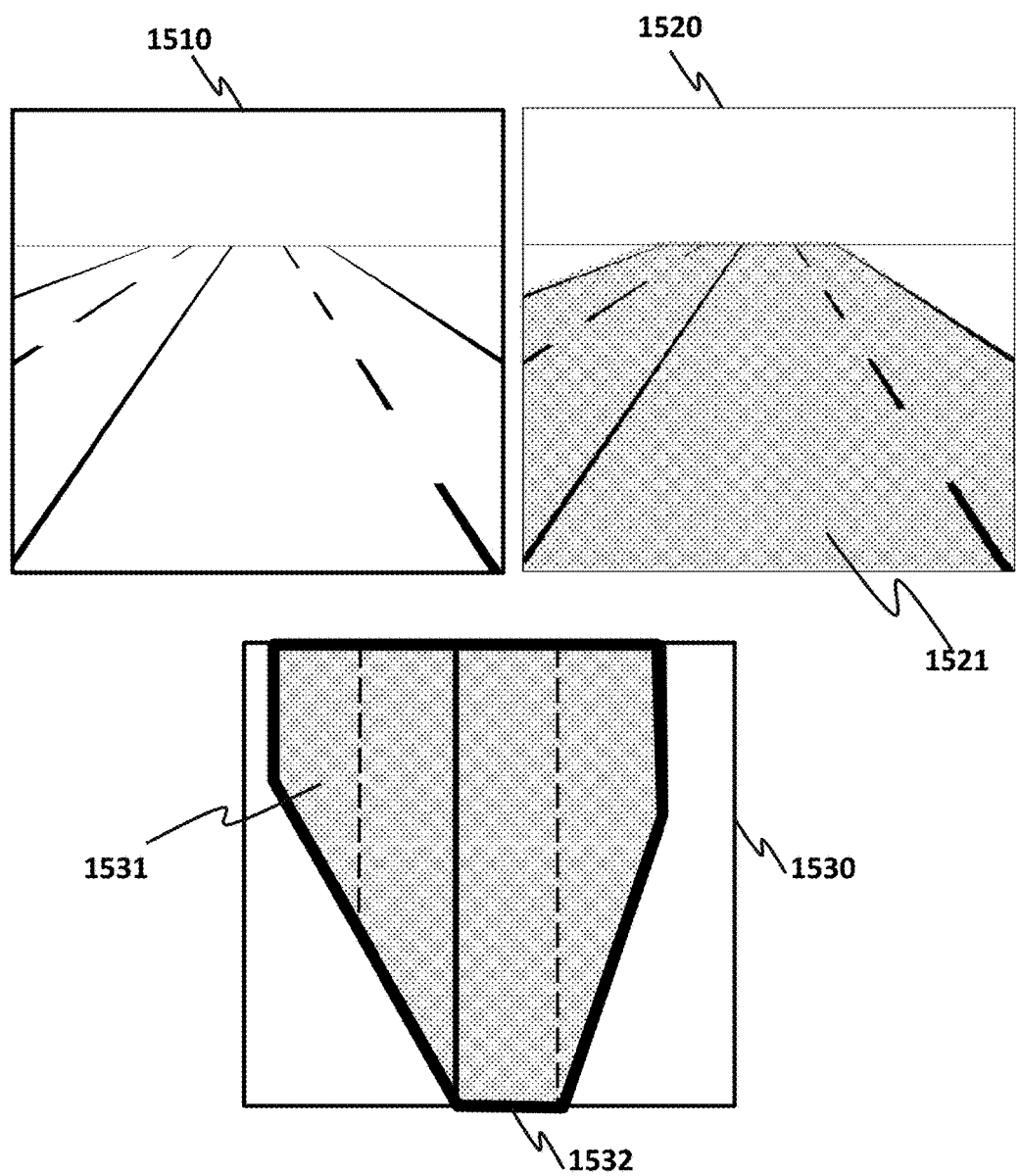

FIG. 15 illustrates this process. The scene 1510 represents a typical image captured by a forward-facing monocular camera. The scene 1520 represents the output of the semantic labeling step. The road surface pixels representing the perceived world (shown as the shaded area 1521) are retained, and the remaining pixels (which represent the unperceived world) are discarded. The scene 1530 shows the result of performing inverse perspective mapping on the image 1521. The scene 1530 corresponds to a top-down view of the perceived world 1531, i.e., viewed from above the ground and looking straight down towards the ground. The thick contour 1532 represents the boundary between the perceived world and unperceived world. The area outside the boundary 1532 is the unperceived world.

Boundary determination using data from multiple sensors. If an AV is equipped with multiple sensors, measurements from one or more of the sensors may be integrated to determine the boundary between the perceived world and unperceived world. Integration of the sensor measurements can be employed as follows.

In some applications, measurements from two or more sensors are utilized and processed independently to generate a perceived world with respect to each individual sensor. The perceived world may then be computed, for example, as the union (or intersection, or result of some other geospatial operation) of these individual perceived areas, and the boundary of the perceived world is the union of the boundaries of individual perceived areas.

In some implementations, instead of forming individual perceived areas from the measurements of individual sensors, measurements from two or more sensors are first fused together using data fusion techniques. The above described methods can then be applied to the fused data to determine the perceived world and evaluate the boundary between the perceived world and unperceived world. This method may be useful, for example, for integrating RADAR and LIDAR sensors, because the measurements returned by these two types of sensors are similar, and the data processing methods are similar as well.

Dark Object Generation Process

Dark objects are unknown or hypothetical or imaginary objects. In a world model, dark objects are generated in the unperceived world while observed objects are placed in the perceived world. A dark object generation process allows an AV system to use the computationally derived boundary between perceived world and unperceived world to reason about unknown objects, and plan the AV's movement (e.g., speed, direction, and trajectory), for example in a safe and conservative manner, taking into account both observed objects in the perceived world and dark objects in the unperceived world.

An unperceived world can be complicated. There may be many dark objects in an unperceived world. Further, dark objects may become present and later absent in the unperceived world. Dark objects can move in the unperceived world, for example, approaching the AV. Therefore, in some implementations, the technologies described in this document can model pessimistic scenarios with respect to the presence, absence, and motion of dark objects, among other attributes. By modeling pessimistic scenarios, driving decisions for the AV system can be more conservative than would otherwise be the case. However, in some implementations, a similar process may be employed to result in a less conservative driving decision or to satisfy other objectives.

The dark object generation process can generate dark objects in an unperceived world immediately adjacent to a boundary with a perceived world and can assign reasonable values to attributes (e.g., position, speed, direction, and orientation) of a dark object that can be chosen to constrain or adjust the AV's motion. In other words, the dark object can be handled as a worst-case scenario for what might reasonably exist in the unperceived world. By reasoning about a worst-case scenario that the AV system might encounter, the AV system's planning and decision-making process can select an action that results in a conservative AV motion.

This document describes examples to illustrate generating dark objects in a manner that represents conservative scenarios and allows an AV system to make a relatively safe (e.g., the safest possible) decision. This document describes methods for generating different types of dark objects, such as vehicles, bicycles, buses, trains, pedestrians and animals, as these are some of the most commonly encountered objects on roads.

Generation of dark objects. An assumption is made that any unknown objects (e.g., dark vehicles) in an unperceived world travel along existing, known traffic lanes on a road network and adhere to the rules of the road. That is, they move within the speed limit (or within some other predefined upper bound that represents a commonly observed maximum speed for vehicles), within a lane, and in the correct direction, and they observe any other rules of the road, such as respecting traffic signs, traffic lights, etc. Therefore, the generation process avoids generating dark objects that are moving above the speed limit, or in the wrong direction, or out of known traffic lanes. The assumption ensures that the AV makes a safe and conservative decision, without being paralyzed in the face of uncertainty by having to consider the potential presence of unknown objects that are not moving according to the rules of the road. However, it is also important to note that in certain geographies, some rules of the road may be commonly flouted. For instance, vehicles in an area may commonly travel faster than a speed limit, and in such a case, a dark vehicle may be generated with an average speed of the vehicles in the area and does not have to be constrained by the speed limit.

It is possible to generate dark objects of different types and sizes and other attributes. The choice of which type and size of a dark object to generate, for example, depends on a number of factors including but not limited to the road configurations, the fleet mix (that is, the mix of vehicles of different attributes) observed in the neighborhood, the vehicle type of the AV, the frequently observed objects, and other considerations. For instance, a preferred rule of the dark object generation in an area where most objects are vans may be to generate a dark van. In an area where heavy trucks are commonly observed, a preferred rule may be to generate dark trucks. In an area where motorcycles are commonly Observed, a preferred rule may be to generate dark motorcycles. The vehicle type of a dark object may also be a random variable with a predefined distribution, and this distribution may be sampled to determine the type of a generated dark object.

To ease the illustrations, the following descriptions consider objects as vehicles, but it is understood that other types of dark objects (e.g., dark pedestrians and dark animals can be generated using the same method.

We assume that the AV system has access to detailed road network information, which includes the configuration of lanes on a roadway (e.g., number and position of lanes, position of centerlines, width, etc.), and other relevant information. Furthermore, the AV system is assumed to be aware of its precise location derived from a localization process that uses data from the AV system's sensors to estimate the precise position of the AV in the world model. Among others, some or all of the following steps can be included in the dark vehicle generation process:

1. Query the road network for lanes in the vicinity of the AV system (for example, within a range of 10, 20, 30, 40, 50, 100, 150, 200, 300, 400, or 500 meters) and store the centerline of each lane as a sequence of discretized points.
2. Check the discretized centerline points of each lane to see if they lie within the unperceived world that was modeled in the step of boundary determination. Points that lie within the unperceived world are labeled as part of an "unknown skeleton" of that lane.

3. For each lane, iterate through the points in its unknown skeleton. In some implementations, the iterations may be based on ordered distances between the points to the AV. For a point under consideration, the dark vehicle generation process creates a representative shape (e.g., a square, a rectangle, a triangle, a polygon, a circle, and an ellipse) centered at the point, oriented in the travel direction of the lane, and of a size representing a potential footprint of the dark vehicle.
4. If the potential footprint of the dark vehicle lies entirely within the unperceived world, generate a dark vehicle centered at that point and deem it to be traveling in the known travel direction of that lane. Next, assign values to the dark vehicle's attributes, e.g., speed. The speed assignment is based on various factors, for instance, regulations (e.g., speed limits, traffic lights, and rule of road), road configurations (e.g., highway, intersection, bifurcation, oneway, four way stop, three way stop, I-intersection, and detour,), weather conditions (e.g., sunny, rainy, snowy, foggy, and smoky), time (e.g., peak hours, day time, night, and early morning), and events (e.g., accidents, protests, and parades). For example, if the dark vehicle is driving in the same direction as the AV, its speed may be set to 0; if the dark vehicle is driving in another direction, the dark vehicle's speed may be set to a speed limit (or a predefined maximum speed contingent on such factors) of the lane.
5. Repeat the previous step for all lanes, until each lane has one or more dark vehicles generated for it, except that if no point in the unknown skeleton of a lane passes the above check in item 2, the lane will not have any dark vehicles generated.

Figure 16:
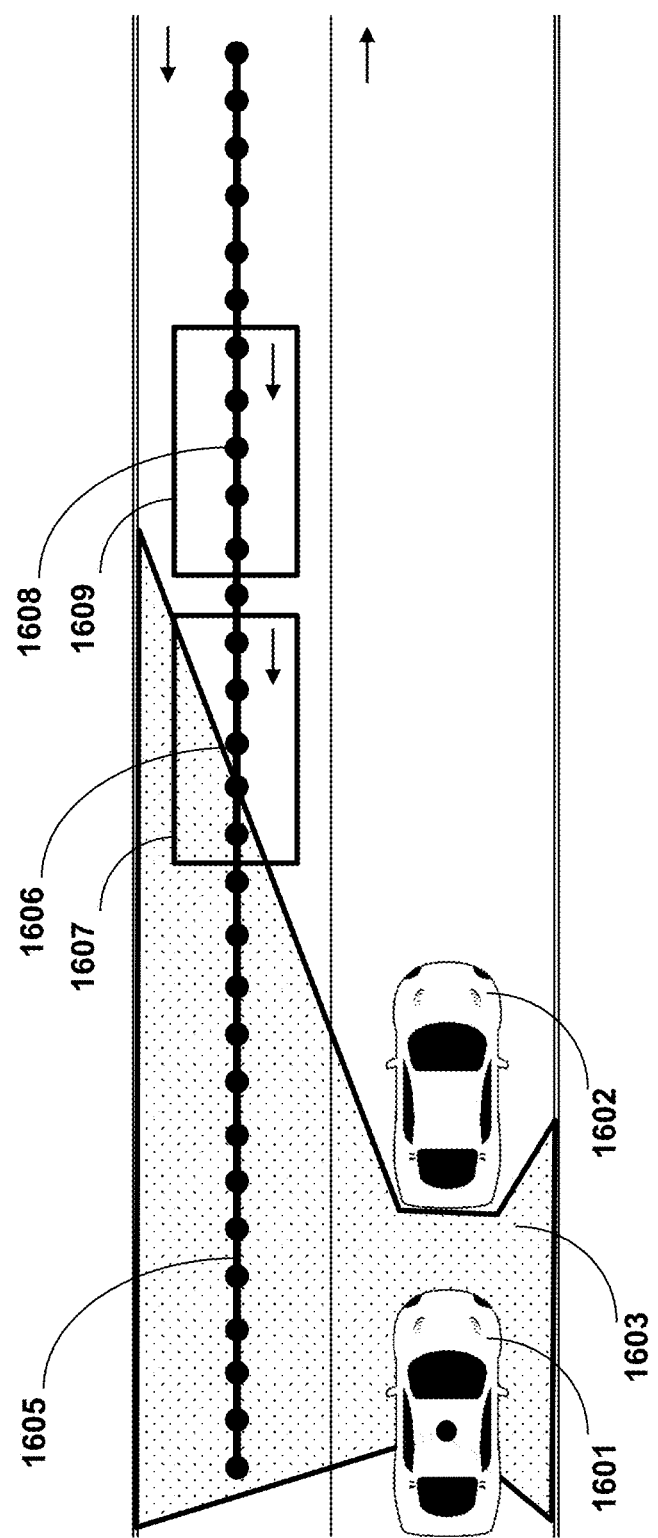
FIG. 16 shows an example of dark vehicle generation.

FIG. 16 illustrates an example of an AV 1601 following another vehicle 1602. The shaded polygon 1603 represents the perceived world perceived by one or more sensors. The road network is queried for lanes in the vicinity of the AV 1601. The line 1605 represents the centerline of a lane, which is discretized into points. Points (e g., 1606) outside the perceived world 1603 constitute the unknown skeleton of the lane. The generation process iterates through the points on the unknown skeleton. For example, at the point 1606, a shape 1607 is created to represent a potential footprint of a dark vehicle. As the potential footprint 1607 of the dark vehicle does not lie entirely outside the perceived world 1603, this point 1606 is disregarded, no corresponding dark vehicle is generated, and the process moves to the successive next points in the unknown skeleton, until reaching point 1608 and generating the footprint 1609 whose size is completely in the unperceived world. A dark vehicle is then generated at the point 1608. The dark vehicle is oriented in same direction as the lane's traffic flow, and its speed is set to the speed limit of the lane or another predefined limit.

The process described above generates dark vehicles and sets attributes (e.g., the position, orientation, speed, size, and type) of the dark vehicles, so that the dark vehicles can be inserted into a world model. In some implementations, a world model allows for inclusion of additional vehicle attributes, such as, but not limited to: vehicle acceleration, status of turn indicators (left turn or right turn indicators, also known as blinkers), the expected future vehicle trajectory (for example, the expected trajectory of that vehicle for the next 1 second, 2 seconds, 3 seconds, 4 seconds, 5 seconds. 10 seconds, or 15 seconds, or the next 5 meters, 10 meters, 15 meters, 20 meters, 25 meters, or 30 meters), and others. In some implementations, these and other attributes are assigned values that conservatively (e.g., most conservatively) restrict the speed or trajectory or both of the AV.

Figure 18:
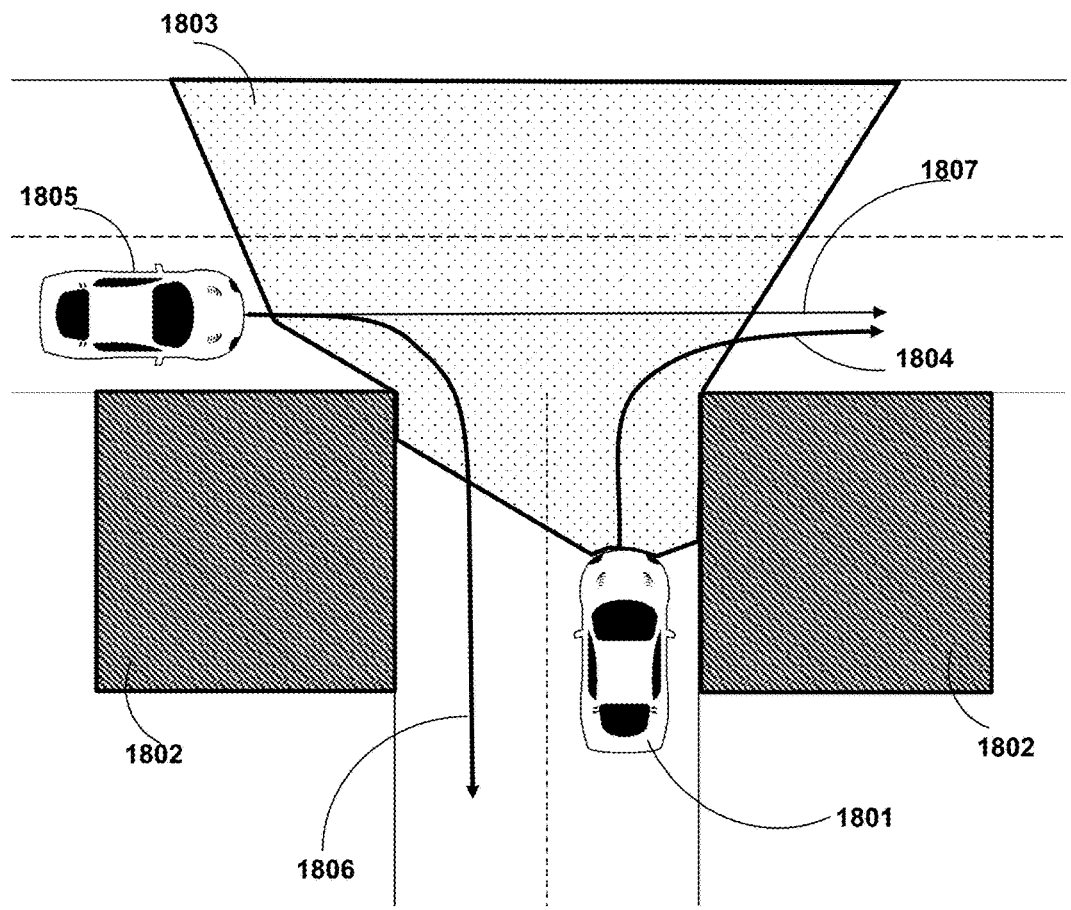
FIG. 18 shows an example of setting an expected future trajectory.

FIG. 18 illustrates a method for setting the expected future trajectory of a generated dark vehicle. An AV 1801 is approaching an intersection with the intention of turning right along the trajectory 1804. The built environment 1802 restricts the sensor's sensing range and field of view, resulting in the perceived area being limited as shown by the shaded polygon 1803. Following the procedure described previously, a dark vehicle 1805 is generated as shown in the unperceived world. To set the expected trajectory of this vehicle, the AV system considers the trajectories available to the vehicle (which may be obtained from the road network). The dark vehicle 1805 may turn right along the trajectory 1806 which is not in conflict with the AV's trajectory 1804, or proceed straight along the trajectory 1807 which may conflict with the AV's trajectory 1804. Therefore, some implementations consider a conservative scenario by setting the trajectory 1807 as the expected future trajectory of the dark vehicle 1805 as that scenario is more restrictive for driving decisions of the AV system than the trajectory 1806, and is more representative of a conservative scenario.

In general, when choosing between multiple trajectories for the dark vehicle, in implementations where the objective is to design a worst-case scenario, the trajectory of the dark vehicle that would cause the most delay for the AV could be chosen, Other measures could also be used to select a trajectory for the dark vehicle from a set of possible trajectories, depending on the purpose for which the dark vehicles are being generated.

In setting the attributes of the generated dark vehicles, it is possible to make use of detailed contextual information, such as outputs from the perception process (such as perceived or inferred states of traffic lights, and the locations, orientations and speeds of other objects), detailed road network information (such as the positions of stop signs and turn restrictions), historical data on the behaviors of vehicles in the neighborhood, and other information. These additional data may be used to model the attributes of the dark vehicles in a richer manner, or for instance in a more conservative manner (i.e., in a way that places a greater restriction on the speed and trajectory decisions of the AV system). The following examples illustrate some scenarios.

If a dark vehicle is generated in a manner (e.g., having a position and orientation) such that it is approaching a traffic light, and if the status of that traffic light were known to be red, the speed of the dark vehicle may be set accordingly, instead of setting the speed to the speed limit of the lane. In this case, the speed may be set as 0 km/hr if the dark vehicle is located at the traffic light's stop line, or otherwise may be set to the maximum speed that the vehicle can drive at (subject to the speed limit of the lane) while being able to decelerate at a reasonable rate and come to a stop before the stop line. A similar procedure may be adopted if the dark vehicle is approaching a stop sign, If the dark vehicle is generated in a lane that also has other known vehicles, the speed of the dark vehicle could be set to the known speed of the known vehicle immediately in front of the dark vehicle if the two are within a certain distance of each other, or if not, to the maximum speed that the dark vehicle could drive at (subject to the speed limit of the lane) while being able to safely decelerate to the speed of the known vehicle in front of it.

If historical data on vehicle behavior in a particular area shows that certain rules of the road are routinely violated, then that behavior could also be applied to dark vehicles. For instance, if analysis of historical data at a particular intersection shows that traffic light violations are observed with a sufficiently high predefined probability, then a dark vehicle being generated at the intersection may also be expected to violate the traffic light, with some predefined probability. For example, if a dark vehicle is generated at the intersection just behind the traffic light stop line, and the status of the traffic light is known to be red, a traffic light violation at this intersection could be provided for by setting the speed of the dark vehicle may be set to the speed limit rather than to 0 km/hr.

Special case: dark bicycles. The above method for generating dark vehicles may also be applied to generating dark bicycles. This is particularly relevant for cities or areas that have exclusive bicycle lanes, where there is road space that is not used by regular vehicles and is reserved for bicycles. In this case, the method for generating dark vehicles may be used with, for example, some or all of the following adaptations: instead of querying the road network for regular traffic lanes, the system queries for bicycle lanes. The speed of the bicycle may be set as high as, faster than, or slower than the AV, up to a predefined upper bound, the bicycle lane is bidirectional, the generated dark bicycle may travel in one of two directions; to be conservative, in some examples, the direction that results in the bicycle moving closer to the AV can be used, as that is likely to result in a conservative scenario and thus a more conservative decision by the AV system.

Special case: dark buses. The dark vehicle generation process may also be applied to generating dark buses. This is particularly relevant for cities or areas that have exclusive bus lanes, i.e., where there is road space that is not used by regular vehicles and is reserved for buses. In this case, the dark vehicle generation process may be used with, for example, some or all of the following adaptations: instead of querying the road network for regular traffic lanes, the process queries for bus lanes. The speed of the bus may be set as high as, faster than, or slower than the AV, up to a predefined maximum value. If the bus lane is designed wider for bidirectional traffic, the direction that results in the bus moving closer to the AV can be used, as that is likely to result in a conservative scenario and thus a more conservative decision by the AV system.

Special case: dark trains. Railroad crossings represent portions of the road network where trains or trams and other vehicles may potentially come into conflict. The dark vehicle generation process may also be applied to generating dark trains. The dark train generation process may infer whether an AV system needs to slow down as it approaches a railroad crossing, or if it is safe for a vehicle to cross a railroad crossing. The method for generating dark vehicles may be used with, for example, some or all of the following adaptations: instead of querying the road network for regular traffic lanes, the system queries for rail roads.

Special case: dark pedestrians. Pedestrians are generally not expected to walk in regular traffic lanes. Crosswalks or pedestrian crossings are examples where pedestrians do share the same road space with other vehicles and objects. In some cases, sidewalks are considered because pedestrians on a sidewalk may enter a crosswalk. Therefore, it may be desirable to generate dark pedestrians as part of the unperceived world. Similar to the dark vehicle generation, the process queries sidewalks, crosswalks, pedestrian crossings, or a combination of them. Then, the dark object generation process is applied. Then a dark pedestrian is assigned a reasonable walking speed or running speed, e.g., 1 km/hr, 2 km/hr, 3 km/hr, 4 km/hr, 5 km/hr, 6 km/hr, 7 km/hr, 8 km/hr, 9 km/hr, 10 km/hr, 11 km/hr, 12 km/hr, 13 km/hr, 14 km/hr, or 15 km/hr.

Temporal filtering. The methods described above for boundary determination and dark object generation can use instantaneous sensor readings, which may cause discontinuities in the boundary and flickering of the dark objects for reasons that include, for example: noise in the sensor measurements and missing or delayed sensor measurements. Since boundary determination and dark object generation are recursively executed through a time course, a temporal filtering or smoothing method may be employed to mitigate the issues by using temporal relationships of dark objects generated at different time steps. Temporal filtering or smoothing may be performed in many ways, and the following represents only some implementations of this idea. The method below is described from the point of view of the vehicle, and it may be adapted to other types of objects such as pedestrians and animals. The steps used by a temporal filtering algorithm can include some of or all of the following steps (and others).

1. The measurements from an instant time are processed to compute the unknown skeletons for each lane, using the methods described in the previous sections.
2. The points belonging to the unknown skeleton of each lane as of the previous time step are propagated forward, that is, the points are moved forward along the centerline of the lane in the travel direction of the lane. The distance by which the points are moved forward is equal to the distance that a dark vehicle on that lane would have traveled in that time step, that is, the speed of a dark vehicle on that lane multiplied by the duration of the time step.
3. The intersection of the two sets of unknown skeletons, i.e., the unknown skeleton from the current time step's measurements (computed in step 1 above), and the forward propagated unknown skeleton from the previous time step (computed in step 2 above), is then taken as the unknown skeleton for the current time step. In some situations, it is possible that an unknown skeleton is not computed from the current time step's measurements (for example, if a sensor returns no measurements or returns junk measurements in the current time step); in such situations, the forward propagated skeleton from the previous time step may be designated as the unknown skeleton for the current time step. Similarly, in some implementations, the forward propagated unknown skeleton from the previous time step may be unavailable (for example, during initialization or the first time step); in such implementations, the unknown skeleton computed from the current time step's measurements may be designated as the unknown skeleton for the current time step.

Figure 17:
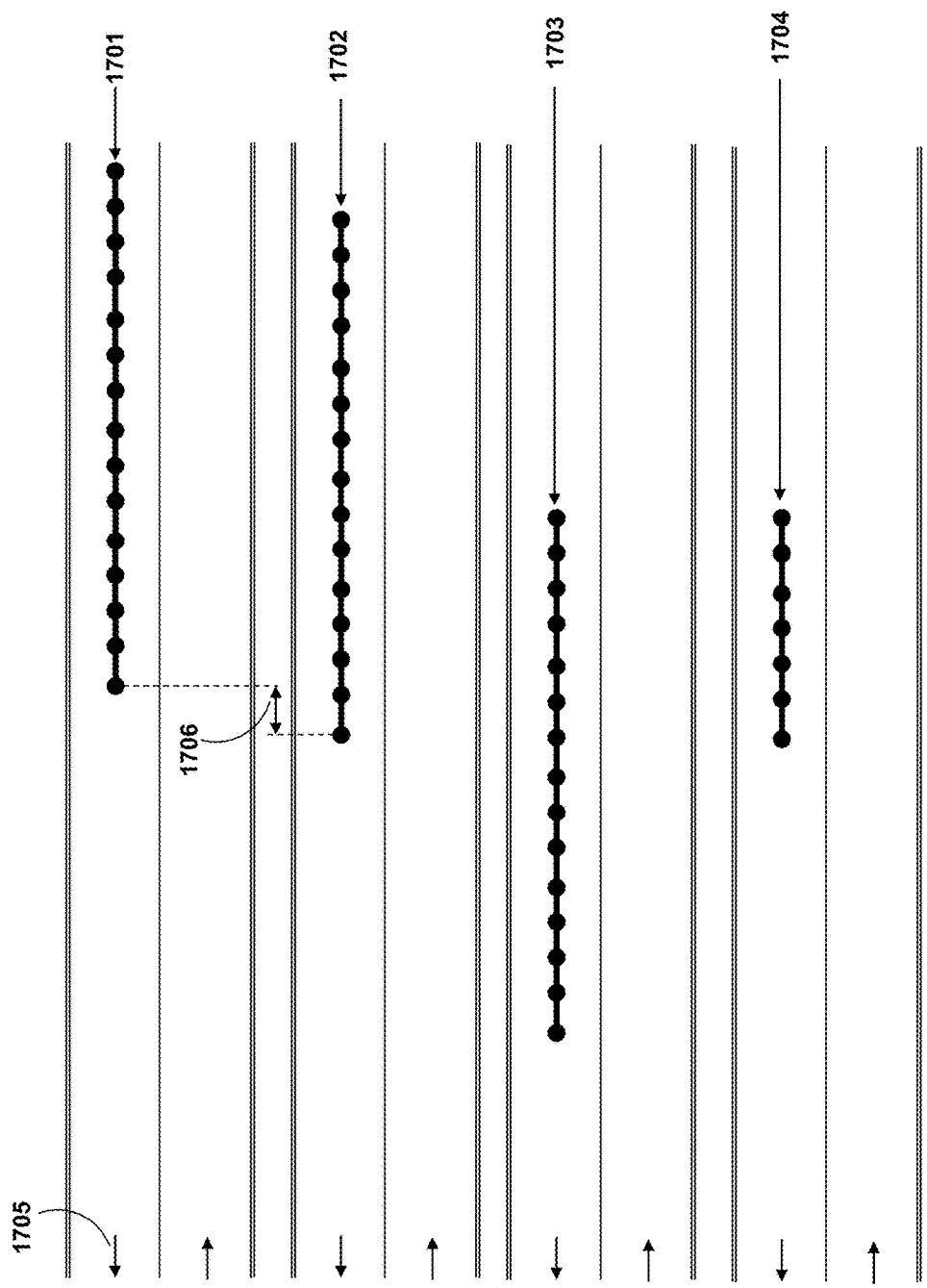
FIG. 17 shows an example of temporal filtering.

This process is illustrated in FIG. 17. The sequence of points 1701 represents the unknown skeleton from the previous time step, while the sequence of points 1703 represents the unknown skeleton computed from the current measurements. The unknown skeleton from the previous time step 1701 is propagated forward, in the travel direction of the lane 1705, by a distance 1706 (that is equal to the distance that would have been covered by a dark vehicle on that lane during that time step), to produce the forward propagated unknown skeleton from the previous time step 1702. Finally, the sequence of points 1704 represents the intersection of the unknown skeleton computed from the current measurements 1703 and the forward propagated unknown skeleton from the previous skeleton 1702, and it is used as the unknown skeleton for the current time step. The unknown skeleton is then used to generate dark objects in the current time step after the dark objects generated in previous time steps are discarded from the world model.

While embodiments have been shown and described in this document, such embodiments are provided by way of example only. Variations, changes, and substitutions will be apparent. It should be understood that other implementations are also within the scope of the claims.

The invention claimed is:

1. A computer-implemented method comprising:
maintaining a model of an environment of a vehicle, the environment of the vehicle including a first section and a second section, wherein the first section is capable of being perceived by one or more sensors of the vehicle based on sensor conditions, wherein the second section is not capable of being perceived by the one or more sensors of the vehicle based on sensor conditions and the second section is adjacent to a boundary with the first section;
selectively generating a hypothetical object that is not perceived by the one or more sensors of the vehicle within a particular location of the second section of the environment of the vehicle, wherein selectively generating the hypothetical object comprises:
obtaining historical data on objects previously observed in the environment at the particular location;
selecting a type of the hypothetical object based on the historical data;
selecting an attribute of the hypothetical object probabilistically based on the objects previously observed in the environment at the particular location;
determining, based on the historical data and objects of a same selected type previously observed in the environment at the particular location, that the selected type of the hypothetical object at the particular location behaves with particular attributes; and
in response to determining the selected type of the hypothetical object at the particular location behaves with particular attributes, selecting an additional attribute of the hypothetical object probabilistically based on the objects previously observed in the environment at the particular location; and
updating the model with the generated hypothetical object at the particular location in the environment of the vehicle.

2. The method of claim 1, in which the hypothetical object comprises a moving object.

3. The method of claim 1, in which the hypothetical object comprises an object that uses a path of travel from which the vehicle is excluded.

4. The method of claim 1, in which the hypothetical object comprises at least one of: a second vehicle, a bicycle, a bus, a train, a pedestrian, and an animal.

5. The method of claim 1, wherein selectively generating the hypothetical object comprises selecting a type of the hypothetical object and an attribute of the hypothetical object probabilistically based on objects previously observed in the environment.

6. The method of claim 5, in which the attribute comprises a size or a speed.

7. The method of claim 1, further comprising including in the model known objects in the environment that are perceived by the one or more sensors of the vehicle or are otherwise known.

8. The method of claim 7, in which the hypothetical object and the known objects maintained by the model are in different parts of the environment.

9. The method of claim 1, in which the vehicle comprises an autonomous vehicle.

10. The method of claim 1, in which the first section and the second section are separated by a boundary.

11. The method of claim 10, comprising detecting of the boundary.

12. The method of claim 11, in which detecting of the boundary comprises using data from one or more sensors to distinguish an observable ground from a foreground that obscures a portion of the observable ground.

13. The method of claim 12, in which the one or more sensors comprise sensors of the vehicle or sensors offboard the vehicle or both.

14. The method of claim 1, further comprising:
querying traffic lane information from a road network database; and
updating, based on the traffic lane information, the generated hypothetical object within the model.

15. The method of claim 1, wherein updating the model with the hypothetical object comprises using stored data to infer a possible location of the hypothetical object.

16. The method of claim 1, wherein updating the model with the hypothetical object comprises determining a location of the vehicle based on a road network database and one or more sensors.

17. The method of claim 1, wherein updating the model with the hypothetical object comprises querying traffic lane information from a database and discretizing a traffic lane into discretized points.

18. The method of claim 1, wherein updating the model with the hypothetical object comprises generating an unknown skeleton of discretized points of a lane that cannot be perceived by the one or more sensors of the vehicle.

19. The method of claim 18, wherein updating the model with the hypothetical object comprises (a) generating a representative shape at a discretized point of the unknown skeleton, and (b) evaluating if the representative shape is completely within the second section of the environment.

20. The method of claim 1, wherein updating the model with the hypothetical object treating a representative shape as the hypothetical object.

21. The method of claim 1 wherein updating the model with the hypothetical object comprises applying temporal filtering to determine a location of the hypothetical object.

22. The method of claim 21, in which applying the temporal filtering comprises smoothing an unknown skeleton by a forward propagated unknown skeleton, wherein the forward propagated unknown skeleton is generated by moving forward an old unknown skeleton along a traffic lane.

23. The method of claim 1, wherein updating the model with the hypothetical object comprises associating one or more attributes with the hypothetical object.

24. The method of claim 23, in which the one or more of the attributes are related to a possible motion state of the hypothetical object.

25. The method of claim 24, in which the motion state comprises a stationary condition.

26. The method of claim 24, in which the motion state comprises a moving condition.

27. The method of claim 24, in which the motion state comprises a speed and a moving direction.

28. The method of claim 27, in which the speed is set to less than or equal to a predetermined maximum value.

29. The method of claim 28, in which the predetermined maximum value comprises a speed limit.

30. The method of claim 28, in which the predetermined maximum value comprises a quantity derived from other objects concurrently or previously observed in the environment.

31. The method of claim 28, in which the predetermined maximum value comprises a quantity derived from at least one of historical data, road configuration, traffic rules, an event, a time, and a weather ondition, hem.

32. The method of claim 1, in which the maintaining of the model comprises accessing a database comprising road network information.

33. The method of claim 1, in which the maintaining of the model comprises using data from the one or more sensors.

34. The method of claim 33, in which the one or more sensors comprise a radar sensor.

35. The method of claim 33, in which the one or more sensors comprise a lidar sensor.

36. The method of claim 33, in which the one or more sensors comprise a camera sensor.

37. The method of claim 36, in which the camera sensor comprises a stereo camera sensor.

38. The method of claim 36, in which the camera sensor comprises a monocular camera sensor.

39. The method of claim 1, comprising updating a trajectory for the vehicle based on the model.

40. The method of claim 39, comprising executing the trajectory for the vehicle.

* * * * *

UNITED STATES PATENT AND TRADEMARK OFFICE
CERTIFICATE OF CORRECTION

PATENT NO. : 10,234,864 B2
APPLICATION NO. : 15/451703
DATED : March 19, 2019
INVENTOR(S) : Emilio Frazzoli and Baoxing Qin Page 1 of 1

It is certified that error appears in the above-identified patent and that said Letters Patent is hereby corrected as shown below:

On the Title Page

Column 1, Line 1, delete "Cambridge," and insert -- Boston, --, therefor.

In the Claims

In Claim 31, delete "ondition, hem." and insert -- condition. --, therefor.

Signed and Sealed this
Twenty-first Day of May, 2019

Andrei Iancu
*Director of the United States Patent and Trademark Office*